US012767185B2

(12) United States Patent
Kume et al.

(10) Patent No.: US 12,767,185 B2
(45) Date of Patent: Oct. 20, 2026

(54) AUTOMATED DRIVING CONTROL DEVICE AND COMPUTER-READABLE STORAGE MEDIUM STORING AUTOMATED DRIVING CONTROL PROGRAM

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 304 days.

(21) Appl. No.: 18/483,592

(22) Filed: Oct. 10, 2023

(65) Prior Publication Data

US 2024/0034363 A1 Feb. 1, 2024

Related U.S. Application Data

(63) Continuation of application No. PCT/JP2022/013981, filed on Mar. 24, 2022.

(30) Foreign Application Priority Data

Apr. 16, 2021 (JP) ................................ 2021-069888
Jan. 7, 2022 (JP) ................................ 2022-001824

(51) Int. Cl.
*B60W 60/00* (2020.01)
*G08G 1/16* (2006.01)

(52) U.S. Cl.
CPC ........... *B60W 60/0051* (2020.02); *G08G 1/16* (2013.01); *B60W 2520/04* (2013.01); *B60W 2520/10* (2013.01); *B60W 2552/10* (2020.02); *B60W 2552/20* (2020.02); *B60W 2554/4041* (2020.02); *B60W 2554/4045* (2020.02); *B60W 2554/406* (2020.02); *B60W 2554/802* (2020.02); *B60W 2754/30* (2020.02)

(58) Field of Classification Search
None
See application file for complete search history.

(56) References Cited

U.S. PATENT DOCUMENTS

2020/0070828 A1 3/2020 Okuda et al.
2024/0034363 A1 2/2024 Kume et al.

FOREIGN PATENT DOCUMENTS

| | | | |
|---|---|---|---|
| JP | 2002052952 | A | 2/2002 |
| JP | 2005324661 | A | 11/2005 |
| JP | 2013050840 | A | 3/2013 |
| JP | 2018103925 | A | 7/2018 |
| JP | 2018188030 | A * | 11/2018 |
| JP | 2022164554 | A | 10/2022 |

OTHER PUBLICATIONS

English Translation of JP 2018188030 A.*

* cited by examiner

*Primary Examiner* — Anshul Sood
(74) *Attorney, Agent, or Firm* — Harness, Dickey & Pierce, P.L.C.

(57) ABSTRACT

By an automated driving control device or a computer-readable storage medium storing an automated driving control program configured to enable traveling of a subject vehicle by an automated driving function, a front vehicle and a rear vehicle that travel in a lane same as a subject vehicle lane where the subject vehicle travels are recognized, and a start of an autonomous traveling control without a periphery monitoring obligation by a driver of the subject vehicle is permitted or determined.

17 Claims, 14 Drawing Sheets

AUTOMATED DRIVING CONTROL DEVICE AND COMPUTER-READABLE STORAGE MEDIUM STORING AUTOMATED DRIVING CONTROL PROGRAM

CROSS REFERENCE TO RELATED APPLICATIONS

The present application is a continuation application of International Patent Application No. PCT/JP2022/013981 filed on Mar. 24, 2022, which designated the U.S. and claims the benefit of priority from Japanese Patent Application No. 2021-069888 filed on Apr. 16, 2021 and the benefit of priority from Japanese Patent Application No. 2022-001824 filed on Jan. 7, 2022. The entire disclosures of all of the above applications are incorporated herein by reference.

TECHNICAL FIELD

The present disclosure relates to an automated driving control device and a computer-readable non-transitory storage medium storing an automated driving control program that enable a subject vehicle to travel using an automated driving function.

BACKGROUND

In a comparative example, a vehicle control device starts an automated driving when a traffic congestion occurs and a length of a traffic congestion section is equal to or higher than a predetermined value. In addition, after the automated driving started, when an automated driving stop condition is satisfied, the vehicle control device stops the automated driving. For example, when several vehicles in front of the subject vehicle are traveling at a distance from each other, it is determined that the automated driving stop condition is satisfied, and the automated driving is stopped.

SUMMARY

By an automated driving control device or a computer-readable storage medium storing an automated driving control program configured to enable traveling of a subject vehicle by an automated driving function, a front vehicle and a rear vehicle that travel in a lane same as a subject vehicle lane where the subject vehicle travels are recognized, and a start of an autonomous traveling control without a periphery monitoring obligation by a driver of the subject vehicle is permitted or determined.

DETAILED DESCRIPTION

Figure 1:
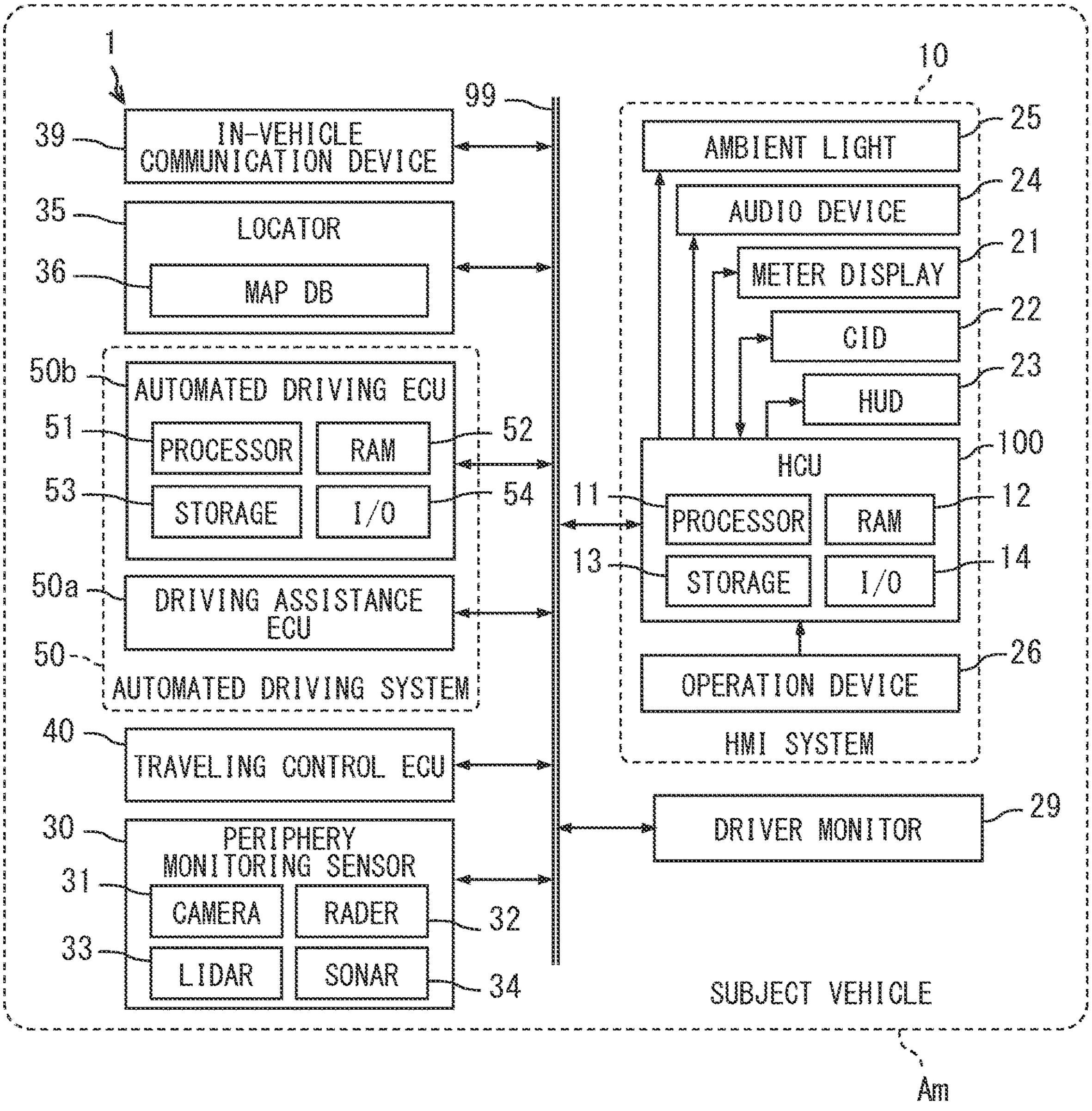
FIG. 1 is a diagram illustrating a whole image of an in-vehicle network including an automated driving ECU according to a first embodiment of the present disclosure.

In addition to recognition of the situation in front of the subject vehicle as in the comparative example, it is conceivable to recognize a situation behind the subject vehicle and determine whether to start the automated driving. An automated driving control device as one conceivable example permits the start of automated driving when both a front vehicle and a rear vehicle are recognized. However, after the automated driving starts, when the automated driving in progress is canceled due to non-detection of the rear vehicle, it becomes difficult to continue the automated driving. It may be likely to impair the user convenience.

The present disclosure provides an automated driving control device and a computer-readable non-transitory storage medium storing an automated driving control program capable of improving a user convenience for an automated driving.

According to one example, an automated driving control device is configured to enable traveling of a subject vehicle by an automated driving function. The automated driving control device includes: a different vehicle recognition unit configured to recognize a front vehicle and a rear vehicle that travel in a lane same as a subject vehicle lane where the subject vehicle travels; and a control switching unit configured to permit a start of an autonomous traveling control without a periphery monitoring obligation by a driver of the subject vehicle when the different vehicle recognition unit has recognized both the front vehicle and the rear vehicle. The control switching unit permits a continuation of the autonomous traveling control even when the different vehicle recognition unit has interrupted a recognition of the rear vehicle after transition to the autonomous traveling control.

Further, according to another example, a computer-readable storage medium stores an automated driving control program configured to enable traveling of a subject vehicle by an automated driving function. The program causes a processor to: recognize a front vehicle and a rear vehicle that travel in a lane same as a subject vehicle lane where the subject vehicle travels; and permit a start of an autonomous traveling control without a periphery monitoring obligation by a driver of the subject vehicle when having recognized both the front vehicle and the rear vehicle; and permit a continuation of the autonomous traveling control even when having interrupted a recognition of the rear vehicle after transition to the autonomous traveling control.

According to these examples, the continuation of the autonomous traveling control is permitted by recognizing both of the front vehicle and the rear vehicle. Even when the recognition of the rear vehicle is interrupted, the continuation is permitted. In this way, when the condition for canceling the autonomous traveling control are relaxed rather than the condition for starting the autonomous traveling control, it becomes easier for the autonomous traveling control without the periphery monitoring obligation to be continued. Accordingly, it is possible to improve the user convenience for the automated driving.

Furthermore, according to another example, an automated driving control device is configured to enable traveling of a subject vehicle by an automated driving function. The automated driving control device includes: a different vehicle recognition unit configured to recognize a front vehicle and a rear vehicle that travel in a lane same as a subject vehicle lane where the subject vehicle travels; and a control switching unit configured to determine to start and cancel an autonomous traveling control without a periphery monitoring obligation by a driver of the subject vehicle according to whether the different vehicle recognition unit has recognized the front vehicle and the rear vehicle. The different vehicle recognition unit relaxes a recognition condition of the different vehicle recognized as the rear vehicle after a start of the autonomous traveling control.

Furthermore, according to another example, a computer-readable storage medium stores an automated driving control program configured to enable traveling of a subject vehicle by an automated driving function. The program causes a processor to: recognize a front vehicle and a rear vehicle that travel in a lane same as a subject vehicle lane where the subject vehicle travels; and determine to start and cancel an autonomous traveling control without a periphery monitoring obligation by a driver of the subject vehicle according to whether to have recognized the front vehicle and the rear vehicle; and relax a recognition condition of the different vehicle recognized as the rear vehicle after starting the autonomous traveling control.

In these examples, after the start of the autonomous traveling control, the recognition condition of the different vehicle recognized as the rear vehicle is relaxed. Therefore, it becomes difficult to cancel the autonomous traveling control when the rear vehicle is no longer recognized. According to the above, it becomes easier to continue the autonomous traveling control without the periphery monitoring obligation. Therefore, it is possible to improve the user convenience of automated driving.

Hereinafter, a plurality embodiments will be described with reference to the drawings.

First Embodiment

A function of an automated driving control device according to a first embodiment of the present disclosure is implemented by an automated driving ECU (Electronic Control Unit) **50*b* shown in FIG. 1. The automated driving ECU 50*b* is mounted on a vehicle (hereinafter referred to as a subject vehicle Am) together with a driving assistance ECU 50*a*. The automated driving ECU 50*b* and the automated driving assistance ECU 50*a* constitute an automated driving system 50 of the subject vehicle Am. By mounting the automated driving system 50**, the subject vehicle Am becomes an automated driving vehicle provided with an automated driving function.

The driving assistance ECU **50*a* is an in-vehicle ECU that implements a driving assistance function that assists driving operation of a driver in the automated driving system 50. The driving assistance ECU 50*a* enables advanced driving assistance of about level 2 or partial automated driving at automated driving levels defined by the Society of Automotive Engineers. The automated driving performed by the driving assistance ECU 50*a*** is an automated driving with periphery monitoring obligation that requires the driver to visually monitor the periphery of the subject vehicle.

The automated driving ECU **50*b* is an in-vehicle ECU that implements an autonomous traveling function capable of replacing a driver's driving operation. The automated driving ECU 50*b* is capable of performing autonomous traveling of a level 3 or higher in which the automated driving system 50 is a control subject. The automated driving performed by the automated driving ECU 50*b*** is an automated driving without monitoring the periphery of the subject vehicle, in other words, an eyes-off automated driving without the periphery monitoring obligation.

In the automated driving system 50, a traveling control state of the automated driving function is switched among multiple functions including at least an automated driving control with the obligation to monitor the periphery by the driving assistance ECU **50*a* and the automated driving control without the obligation to monitor the periphery by the automated driving ECU 50*b*. In the following description, the automated driving control of level 2 or lower by the driving assistance ECU 50*a* may be described as "driving assistance control", and the automated driving control of level 3 or higher by the automated driving ECU 50*b* may be described as "autonomous traveling control". The automated driving ECU 50*b*** may be capable of implementing an automated driving function of level 4 or higher.

During an automated traveling period in which the subject vehicle Am travels under the autonomous traveling control by the automated driving ECU **50*b*, the driver is permitted to perform a specific action (hereinafter referred to as second task) other than a predetermined driving. In the drawings, the terms of "traffic congestion" may be also referred to as "CGT". The second task is legally permitted to the driver until the automated driving ECU 50*b* requests the implementation of a driving operation performed in cooperation with an HCU (Human Machine Interface Control Unit) 100**, which will be described later, that is, until a request for driving change occurs. For example, watching entertainment content such as video content, operating a device such as a smartphone, eating a meal, and the like are assumed as second tasks.

Figure 2:
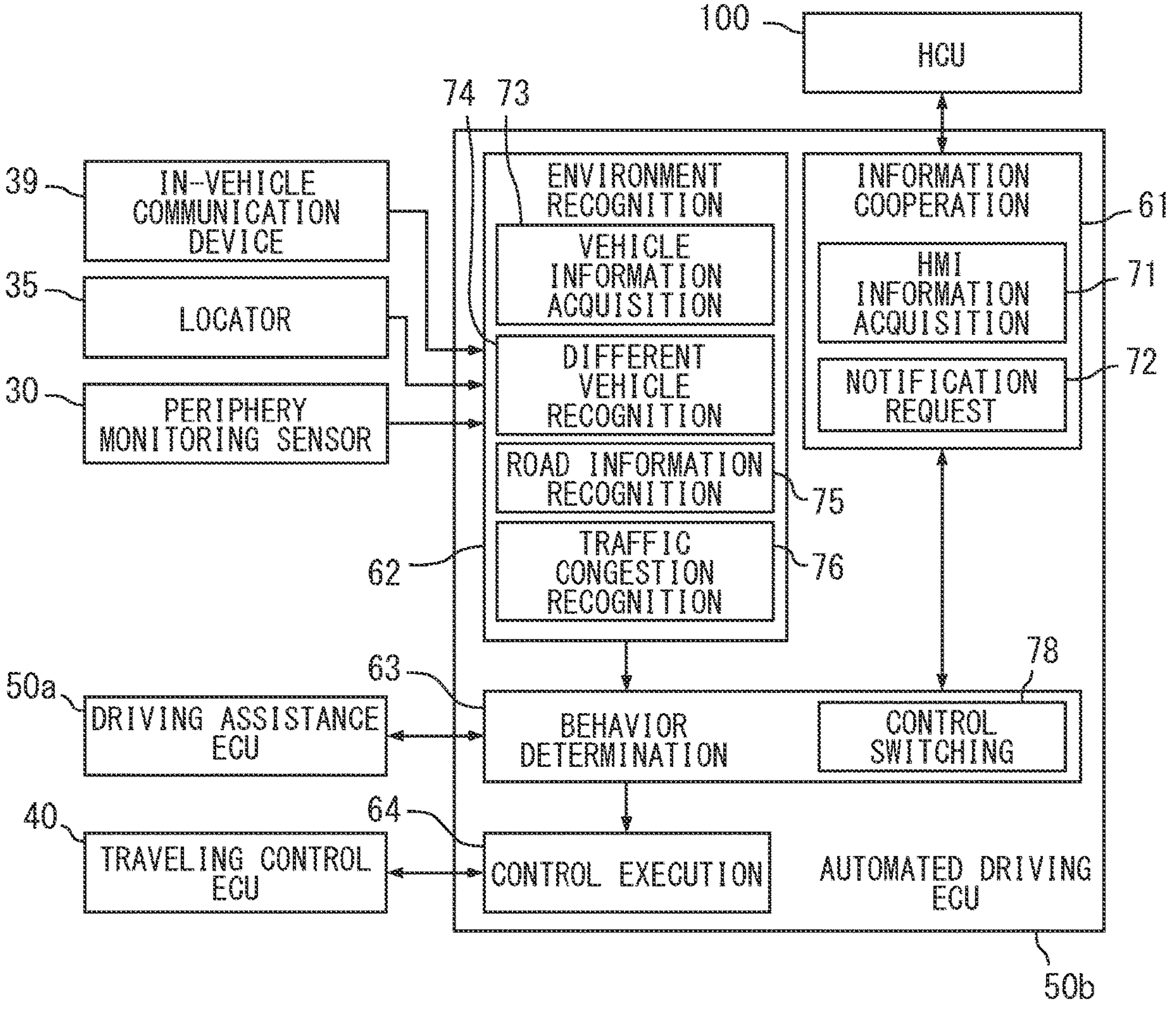
FIG. 2 is a block diagram showing details of the automated driving ECU.
Figure 3:
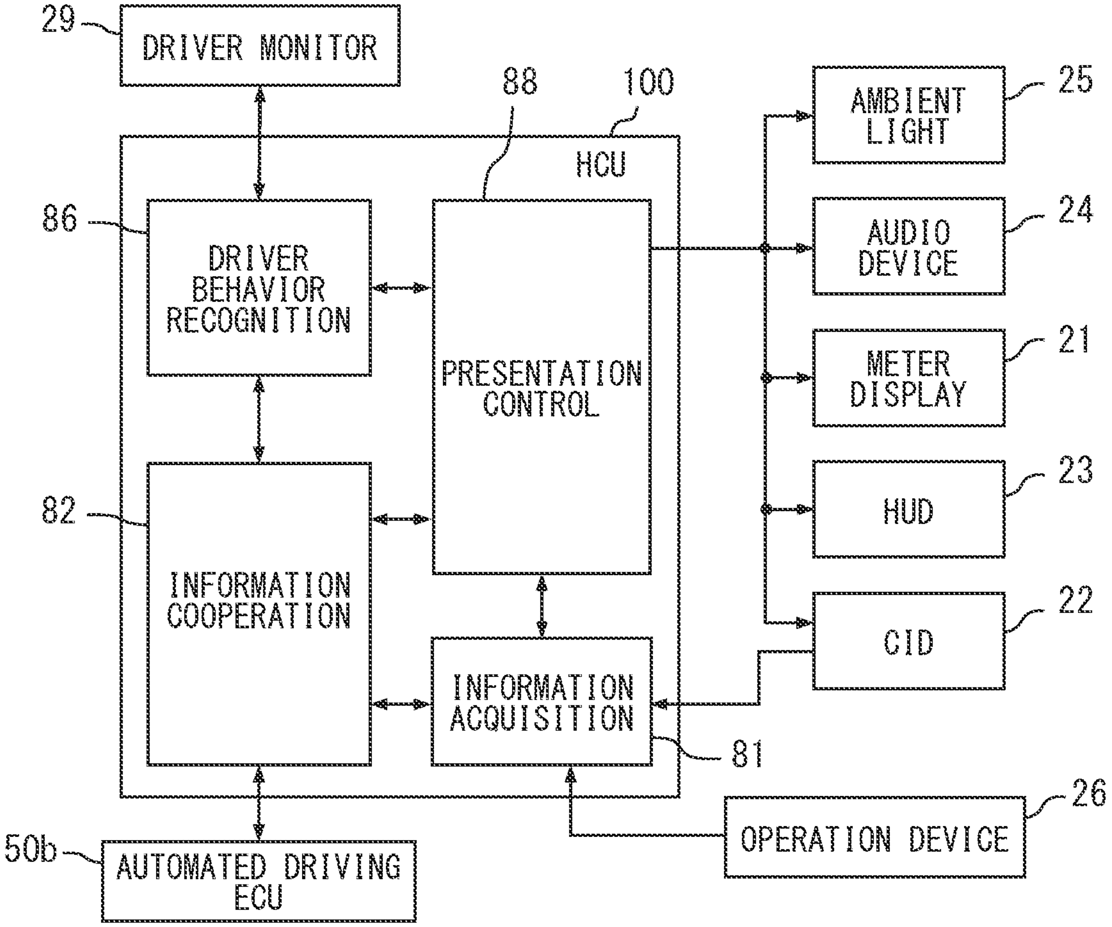
FIG. 3 is a block diagram showing details of an HCU.

The driving assistance ECU **50*a* and the automated driving ECU 50*b* are communicably connected to a communication bus 99 of an in-vehicle network 1 mounted on the subject vehicle Am. As shown in FIGS. 1 to 3, the communication bus 99 is connected to a driver monitor 29, a periphery monitoring sensor 30, a locator 35, an in-vehicle communication device 39, a travel control ECU 40, the HCU 100, and the like. The multiple nodes connected to the communication bus 99 can communicate with one another. Specific nodes of these ECUs and the like may be directly electrically connected to each other and communicate without the communication bus 99**.

The driver monitor 29 includes a near-infrared light source, a near-infrared camera, and a control unit that controls them. The driver monitor 29 is installed, for example, on an upper surface of a steering column portion or an upper surface of an instrument panel in a posture in which the near-infrared camera faces a headrest portion of a driver's seat. The near-infrared camera may be integrated with a meter display 21 or a center information display (hereinafter, CID) 22 to be described later so as to be placed in either screen.

The driver monitor 29 photographs, with the near-infrared camera, the head of a driver that is irradiated with near-infrared light by the near-infrared light source. An image captured by the near-infrared camera is subjected to image analysis by the control unit. The control unit extracts information such as the driver's eye point position and line-of-sight direction from the captured image. The driver monitor 29 provides driver status information extracted by the control unit to the HCU 100, the automated driving ECU 50*b*, and the like.

Figure 4:
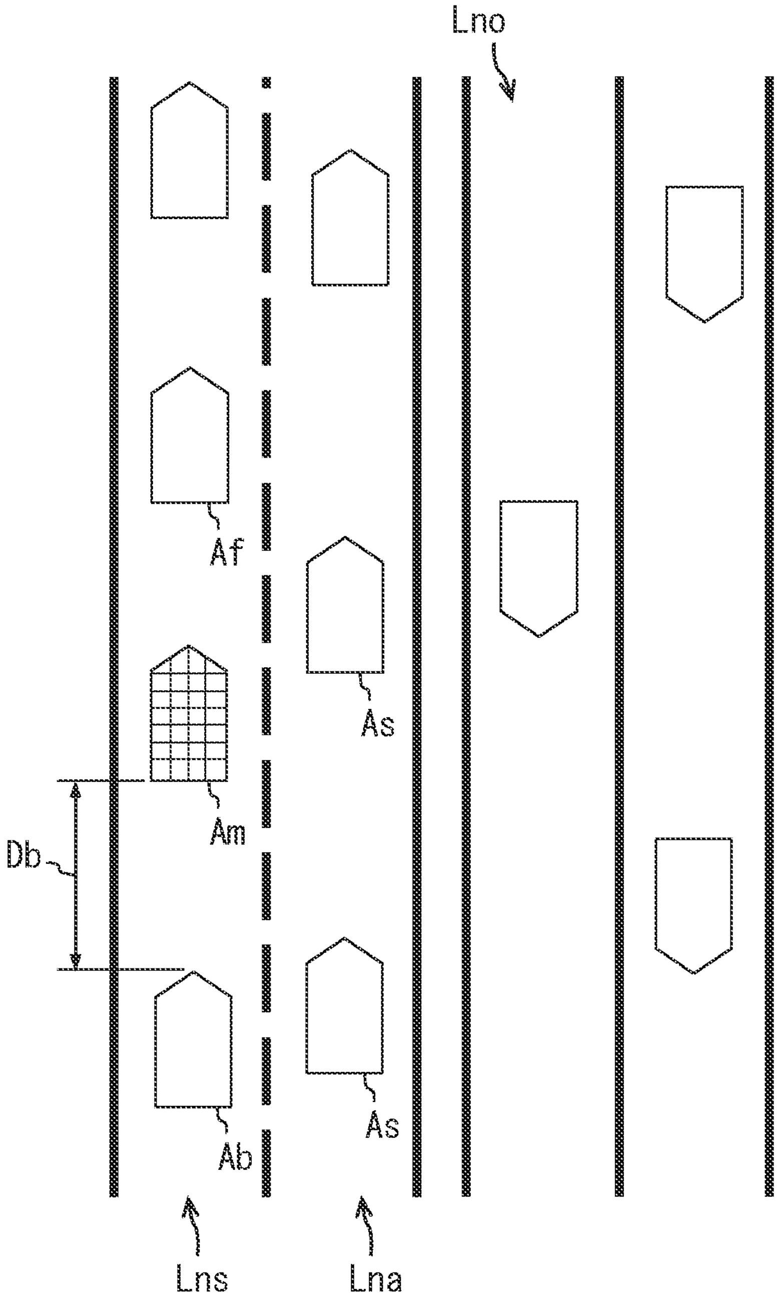
FIG. 4 is a diagram showing one example of a positional relationship between a subject vehicle and different vehicles in peripheral of the subject vehicle.

The periphery monitoring sensor 30 is an autonomous sensor that monitors a peripheral environment of the subject vehicle Am. The periphery monitoring sensor 30 can detect a moving object and a stationary object in a detection range at the periphery of the subject vehicle. The periphery monitoring sensor 30 can detect a different vehicle, specifically, a front vehicle Af, a rear vehicle Ab, a side vehicle As (see FIG. 4), and the like traveling in the periphery of the subject vehicle Am. The side vehicle may mean a vehicle positioned at the left or the right of the subject vehicle Am. The periphery monitoring sensor 30 provides detection information of objects in the periphery of the subject vehicle to the driving assistance ECU 50*a*, the automated driving ECU 50*b*, and the like.

The periphery monitoring sensor 30 includes, for example, one or more of camera unit 31, a millimeter wave radar 32, a lidar 33 and a sonar 34. The camera unit 31 may have a configuration including a monocular camera or may have a configuration including a compound-eye camera. The camera unit 31 is mounted on the subject vehicle Am so as to be able to image a range in front of the subject vehicle Am. The camera unit 31 capable of imaging, in other words, capturing the side range and the rear range of the own vehicle Am may be mounted on the subject vehicle Am. The camera unit 31 outputs at least one of imaging data obtained by imaging the surroundings of the subject vehicle and an analysis result of the imaging data as detection information.

The millimeter-wave radar 32 emits a millimeter wave or a quasi-millimeter wave toward the periphery of the subject vehicle. The millimeter-wave radar 32 outputs detected information generated by processing to receive a reflected wave reflected by the moving object, the stationary object, or the like. The lidar 33 emits a laser beam toward the periphery of the subject vehicle. The lidar 33 outputs the detection information generated by a process of receiving laser light reflected by a moving object, a stationary object, or the like existing within the irradiation range. The sonar 34 emits ultrasonic waves to the periphery of the subject vehicle. The sonar 34 outputs detection information generated by a process of receiving ultrasonic waves reflected by moving and stationary objects existing near the subject vehicle.

The locator 35 includes a GNSS (global navigation satellite systems) receiver, an inertial sensor, and the like. The locator 35 combines positioning signal received by the GNSS receiver, measurement result of the inertial sensor, vehicle speed information output to the communication bus 99, and the like, and successively specifies a position and a travelling direction of the subject vehicle Am. The locator 35 sequentially outputs, as locator information, the position information and the direction information of the subject vehicle Am based on a positioning result to the communication bus 99.

The locator 35 further has a map database (hereinafter referred to as map DB) 36 that stores map data. The map DB 36 mainly includes a large-capacity storage medium storing a large number of pieces of three-dimensional map data and two-dimensional map data. The three-dimensional map data includes information necessary for advanced driving assistance and automated driving, such as three-dimensional shape information on a road and detailed information on each lane. The locator 35 reads map data of the periphery of the current position from the map DB 36, and provides it to the driving assistance ECU 50*a*, the automated driving ECU 50*b*, and the like with locator information.

The in-vehicle communication device 39 is a vehicle exterior communication unit mounted on the subject vehicle Am and functions as a V2X (Vehicle to Everything) communication device. The in-vehicle communication device 39 transmits and receives information to and from a roadside device installed on the side of the road by wireless communication. In one example, the in-vehicle communication device 39 receives traffic congestion information of the periphery of the current position of the subject vehicle Am and in the traveling direction from a roadside device. The traffic congestion information is VICS (registered trademark) information or the like. The in-vehicle communication device 39 provides the received traffic congestion information to the automated driving ECU 50*b* and the like.

The traveling control ECU 40 is an electronic control unit that mainly includes a microcontroller. The travel control ECU 40 has at least functions of a brake control ECU, a drive control ECU, and a steering control ECU. The travel control ECU continuously executes a braking force control of each wheel, an output control of an in-vehicle power source, and a steering angle control on the basis of any one of an operation command based on a driving operation by the driver, a control command by the driving assistance ECU 50*a*, and a control command by the automated driving ECU In addition, the travel control ECU 40 generates vehicle speed information indicating the current travel speed of the subject vehicle Am on the basis of a detection signal of a wheel speed sensor provided in the hub portion of each wheel, and sequentially outputs the generated vehicle speed information to the communication bus 99.

The HCU 100 comprises an HMI (Human Machine Interface) system together with multiple display devices, an audio device 24, an ambient light 25, an operation device 26, and the like. The HMI system 10 has an input interface function that accepts an operation made by an occupant such as a driver of the subject vehicle Am, and an output interface function that presents information to the driver.

The display device presents information through image display or the like through the driver's vision. The display devices include a meter display 21, a CID 22, a head-up display (hereinafter referred to as HUD) 23, and the like. The CID 22 has a touch panel function and detects a touch operation on the display screen by the driver or the like. The audio device 24 includes speakers installed in a vehicle compartment in an arrangement in the periphery of the driver seat, and outputs a notification sound, a voice message, or the like from the speakers in the vehicle compartment. The ambient light 25 is provided on an instrument panel, a steering wheel, a door trim, and the like. The ambient light 25 presents information using the driver's peripheral vision by ambient display that changes the color of emitted light.

The operation device 26 is an input portion that receives an operation of user, such as a driver or the like. The user operation or the like related, for example, to the operation and stop of the automated driving function is input to the operation device 26. In one example, a driver input is input to the operation device 26 to instruct transition from the driving assistance control to the autonomous traveling control. The operation device 26 includes a steering switch provided on a spoke portion of a steering wheel, an operation lever provided on a steering column portion, a voice input device that recognizes utterance content of the driver, and the like.

The HCU 100 functions as a presentation control device that comprehensively controls the presentation of information related to the automated driving to the driver. The HCU 100 requests the driver to change driving based on the driving operation execution request from the automated driving ECU 50*b*. In addition, the HCU 100 can cooperate with the automated driving ECU 50*b* to permit the driver to perform the second task, and can reproduce video content or the like related to the second task without interfering with the request for driving change.

The HCU 100 mainly includes a control circuit including a processor 11, a RAM 12, a storage 13, an I/O interface 14, a bus that connects them, and the like. The processor 11 is a hardware combined with the RAM 12, and executes arithmetic processing. The processor 11 includes at least one arithmetic core, such as a central processing unit (CPU) or a graphics processing unit (GPU). The processor 11 may further include a field-programmable gate array (FPGA), a neural network processing unit (NPU), an IP core having other dedicated functions, and the like. The RAM 12 may include a video RAM for generating video data. The processor 11 accesses the RAM 12 to execute various processes for a presentation control process. The storage 13 includes a non-volatile storage medium. The storage unit 13 stores various programs (a presentation control program, etc.) to be executed by the processor 11.

The HCU 100 has multiple functional units for integrally controlling presentation information to the driver by executing the presentation control program stored in the storage 13 by the processor 11. Specifically, the HCU 100 includes functional units such as an information acquisition unit 81, an information cooperation unit 82, a driver behavior recognition unit 86, and a presentation controller 88 (see FIG. 3).

The information acquisition unit 81 acquires vehicle information indicating a state of the subject vehicle Am from the communication bus 99. The vehicle information includes vehicle speed information provided to the communication bus 99 by the travel control ECU 40, for example. In addition, the information acquisition unit 81 acquires operation information indicating the content of the user operation from the CID 22, the operation device 26, or the like.

The information cooperation unit 82 cooperates with an information cooperation unit 61 (described later) of the automated driving ECU 50*b* to enable sharing of information between the automated driving system 50 and the HCU 100. The information cooperation unit 82 provides, to the automated driving ECU 50*b*, operation information recognized by the information acquisition unit 81, driver behavior information (described later) recognized by the driver behavior recognition unit 86, and the like.

The information cooperation unit 82 recognizes the operation state of automatic driving by the automated driving system 50 by acquiring control status information indicating the state of the automated driving function. Based on the control status information, the information cooperation unit 82 determines whether the driving control in the execution state is driving assistance control or autonomous traveling control, in other words, whether the traveling control executed by the automated driving function has the periphery monitoring obligation.

The information cooperation unit 82 acquires a notification execution request output by a notification request unit 72 (described later) of the automated driving ECU 50*b*. The information cooperation unit 82 acquires, from the automated driving ECU 50*b*, an execution request for a driving change request provided to the driver, an execution request to implement control transition notification related to the transition from the driving assistance control to the autonomous traveling control, and the like. The information cooperation unit 82 cooperates with the presentation controller 88 to control the content and execution timing of each notification based on the request to provide each notification.

The driver behavior recognition unit 86 recognizes the state and behavior of the driver based on the driver status information obtained from the driver monitor 29. As an example, the driver behavior recognition unit 86 recognizes task information or the like indicating the content of the second task being executed by the driver. For example, the task information is information such as operating a smartphone, watching a screen of the CID 22, operating a touch panel of the CID 22, and the like. The driver behavior recognition unit 86 may further recognize monitoring information indicating whether the driver is the periphery of the subject vehicle Am, posture information indicating whether the driver driving posture is appropriate, and the like. In addition, the driver behavior recognition unit 86 may be able to further acquire driving operation information indicating operations such as steering operation, accelerator operation, and brake operation by the driver, seatbelt attachment-detachment information, and the like. The driver behavior recognition unit 86 provides the driver behavior information including task information and the like to the presentation controller 88 and the information cooperation unit 82.

The presentation controller 88 integrally controls provision of information to the driver using each display device, the audio device 24, and the ambient light 25. The presentation controller 88 provides and presents content according to the operation state of the automated driving based on the control status information and the execution request acquired by the information cooperation unit 82 and the driver behavior information recognized by the driver behavior recognition unit 86. Specifically, when the information cooperation unit 82 recognizes that the automated driving ECU 50*b* is executing the autonomous traveling control, the presentation controller 88 enables reproduction of video content and the like. Furthermore, the presentation controller 88 performs notification for requesting the driver to change driving when cancellation of the autonomous traveling control, which does not have the obligation to monitor the periphery, is scheduled.

Next, details of each of the driving assistance ECU 50*a* and the automated driving ECU 50*b* will be described in order.

The driving assistance ECU 50*a* is a computer mainly including a control circuit including a processing unit, a RAM, a storage, an I/O interface, a bus connecting them, and the like. The driving assistance ECU 50*a* implements driving assistance functions such as ACC (Adaptive Cruise Control), LTC (Lane Trace Control) and LCA (Lane Change Assist) by executing programs in the processor. In one example, the driving assistance ECU 50*a* implements driving assistance control for causing the subject vehicle Am to travel along the subject vehicle lane Lns in which the vehicle Am is traveling, in cooperation with each function of ACC and LTC.

The automated driving ECU 50*b* has the higher calculation capability than the driving assistance ECU 50*a*, and can execute at least travel control corresponding to ACC, LTA, and LCA. The automated driving ECU 50*b* is a computer mainly including a control circuit including a processor 51, a RAM 52, a storage 53, an I/O interface 54, a bus connecting them, and the like. The processor 51 accesses the RAM 52 to execute various processes for implementing the automated driving control method of the present disclosure. The storage 53 stores various programs (automated driving control program, and the like) to be executed by the processor 51. By executing the program by the processor 51, the automated driving ECU 50*b* includes an information cooperation unit 61, an environment recognition unit 62, a behavior determination unit 63, a control execution unit 64, and the like as a plurality of functional units for implementing the automated driving function (see FIG. 2).

The information cooperation unit 61 provides information to the information cooperation unit 82 of the HCU 100 and acquires information from the information cooperation unit 82. By cooperation of these information cooperation units 61 and 82, the automated driving ECU 50*b* and the HCU 100 share the information which each acquired. The information cooperation unit 61 generates control status information indicating the operating state of the automated driving function, and provides the generated control status information to the information cooperation unit 82. The information cooperation unit 61 has an HMI information acquisition unit 71 and a notification request unit 72 as sub-function units for the information cooperation.

The HMI information acquisition unit 71 acquires operation information, driver behavior information, and the like from the information cooperation unit 82. Based on the operation information, the HMI information acquisition unit 71 recognizes user operations input to the CID 22, the operation device 26, and the like. In one example, the HMI information acquisition unit 71 recognizes a level 3 transition operation that instructs transition from the driving assistance control to the autonomous traveling control. In addition, the HMI information acquisition unit 71 recognizes the behavior of the driver during a driving assistance period and an automated traveling period based on the driver behavior information. The HMI information acquisition unit 71 recognizes whether the driver monitors the periphery (monitoring information), whether the driver driving posture is appropriate (posture information), and the details of the second task performed by the driver (task information), and the like.

The HMI information acquisition unit 71 may have the same function as the driver behavior recognition unit 86 of the HCU 100. More specifically, the HMI information acquisition unit 71 may acquire driver status information from the driver monitor 29, and be able to recognize the details of the driver behavior in the same manner as the driver behavior recognition unit 86.

In addition, the notification request unit 72 outputs a notification execution request to the information cooperation unit 82 to enable notification by the HCU 100 in synchronization with the operating state of the automated driving function. As described above, the notification request unit 72 transmits, to the information cooperation unit 82, the driving change request execution request, the control transition notification execution request, and the like as the notification execution request related to the automated driving.

The environment recognition unit 62 combines the locator information and the map data acquired from the locator 35 with the detection information acquired from the periphery monitoring sensor 30 to recognize the traveling environment of the subject vehicle Am. The environment recognition unit 62 includes a vehicle information acquisition unit 73, a different vehicle recognition unit 74, a road information recognition unit 75, and a traffic congestion recognition unit 76 as sub-function units for the traveling environment recognition.

The vehicle information acquisition unit 73 acquires vehicle information indicating a state of the subject vehicle Am from the communication bus 99. In one example, the vehicle information acquisition unit 73 acquires vehicle speed information indicating the current travel speed of the subject vehicle Am.

The different vehicle recognition unit 74 recognizes the relative positions and relative velocities of dynamic targets around the subject vehicle. The dynamic targets includes, for example, other vehicles traveling in the periphery of the subject vehicle Am. The different vehicle recognition unit 74 detects the front vehicle Af and the rear vehicle Ab traveling in the same lane as the subject vehicle Am (hereinafter referred to as a subject vehicle lane Lns, see FIG. 4), and the side vehicle As traveling in an adjacent lane Lna adjacent to the subject vehicle lane Lns (see FIG. 4), and the like. In one example, the different vehicle recognition unit 74 recognizes, as the front vehicle Af, a front different vehicle whose distance from the subject vehicle Am is equal to or less than a predetermined distance and whose relative speed to the subject vehicle Am is equal to or less than a predetermined speed. Similarly, the different vehicle recognition unit 74 recognizes, as the rear vehicle Ab, a rear different vehicle whose distance from the subject vehicle Am is equal to or less than a predetermined distance and whose relative speed to the subject vehicle Am is equal to or less than a predetermined speed. The above-described predetermined distance and predetermined speed for recognizing different vehicles in front of and in rear of the subject vehicle as the front vehicle Af and the rear vehicle Ab may be different between the front and rear directions.

In addition, the different vehicle recognition unit 74 recognizes lane changes of the front vehicle Af and the rear vehicle Ab to the adjacent lane Lna, lane changes of the side vehicle As to the subject vehicle lane Lns, and the like. In a road environment in which a median strip exists between the subject vehicle lane Lns and the adjacent lane Lna and an oncoming lane Lno (see FIG. 4), the different vehicle recognition unit 74 may not recognize the different vehicle in the oncoming lane Lno.

The road information recognition unit 75 recognizes information about the road on which the subject vehicle Am travels. The road information recognition unit 75 recognizes, for example, a road shape of the road on which the subject vehicle Am travels. Specifically, the road information recognition unit 75 recognizes the curvature of the curve section of the road on which the subject vehicle Am travels, the gradient of the road, and the like.

In addition, the road information recognition unit 75 recognizes whether the road on which the subject vehicle Am travels or the road on which the vehicle Am is scheduled to travel is within a preset permission area or a limited permission area. Information indicating whether the area is a permission area or a limited permission area may be recorded in the map data stored in the map DB 36 or may be included in the reception information received by the in-vehicle communication device 39.

The permission area and the limited permission area may correspond to an operational design domain where the automated driving without the periphery monitoring obligation of the driver is legally permitted. In more detail, the automated driving without the periphery monitoring obligation has a plurality of execution modes. The execution modes includes a traffic congestion limit control (hereinafter referred to as traffic congestion level 3), which is limitedly executed for traveling in traffic congestion, and an area limit control (hereinafter referred to as area level 3), which is limitedly executed in a specific permission area. On roads within the permission area, both executions at both the traffic congestion level 3 and the area level 3 are permitted. On roads within the limited area, the execution of only the traffic congestion level 3 is permitted. On a road (hereinafter referred to as a non-permission area) that is not included in the permission area and the limited permission area, the automated driving without the periphery monitoring obligation is prohibited. The permission area and the limited permission area are set, for example, on expressways or motorways.

The traffic congestion recognition unit 76 combines the information of different vehicles recognized by the different vehicle recognition unit 74 and the vehicle speed information recognized by the vehicle information acquisition unit 73, and recognizes the traffic congestion around the subject vehicle Am. The traffic congestion recognition unit 76 may use the traffic congestion information received by the in-vehicle communication device 39 to recognize the traffic congestion around the subject vehicle. The traffic congestion recognition unit 76 executes a traffic congestion determination process (see FIG. 7) for determining whether the traffic congestion state has occurred in the periphery of the subject vehicle, and a traffic congestion solving determination process (see FIG. 7) for determining whether the traffic congestion in the periphery of the subject vehicle has been resolved (see FIG. 8). The traffic congestion recognition unit 76 may further perform a solving prediction determination for predicting whether the traffic congestion is going to be solved.

The behavior determination unit 63 cooperates with the HCU 100 to control the driving change between the automated driving system 50 and the driver. The behavior determination unit 63 generates a schedule travel line to cause the subject vehicle Am to travel based on the recognition result of the traveling environment by the environment recognition unit 62 when the automated driving system 50 has a right to control the driving operation. The behavior determination unit 63 outputs the generated schedule travel line to the control execution unit 64. The behavior determination unit 63 includes a control switching unit 78 as a sub-function unit for controlling the operating state of the automated driving function.

The control switching unit 78 cooperates with the driving assistance ECU 50*a* to execute the driving control switching process (see FIG. 5), which will be described later, to perform switching between the driving assistance control with the periphery monitoring obligation of the driver, and the autonomous traveling control without the periphery monitoring obligation of the driver. In addition, the control switching unit 78 switches the travel control state among a plurality of states including the area level 3 and the traffic congestion level 3 when the subject vehicle Am is caused to travel by the autonomous traveling control. For example, when the HMI information acquisition unit 71 recognizes the input of the level 3 transition operation by the driver, the control switching unit 78 switches the traveling control state from the driving assistance control to the autonomous traveling control based on the establishment of a condition for starting the autonomous traveling control (described later). Further, after the transition to the autonomous traveling control, when the condition for canceling the autonomous traveling control (to be described later) is established, the control switching unit 78 switches the traveling control state from the autonomous traveling control to the driving assistance control.

The operation execution unit 64 performs acceleration-deceleration control and steering control of the subject vehicle Am according to the schedule travel line generated by the behavior determination unit 63 in cooperation with the traveling control ECU 40 when the automated driving ECU 50*b* has the right to control the driving operation. More specifically, the operation execution unit 64 generates control commands based on the schedule travel line, and sequentially outputs the generated control commands to the traveling control ECU 40.

Next, the details of the driving assistance control and the switching of traffic congestion level 3 performed by the control switching unit 78 will be described.

In the control switching unit 78, in relation to the rear vehicle Ab, the condition (cancelation condition) for shifting from the traffic congestion level 3 to the driving assistance control is set to be more relaxed than the condition (start condition) for shifting from the driving assistance control to the traffic congestion level 3. As a result, after the transition to traffic congestion level 3, it becomes difficult to shift to the driving assistance control. Specifically, when the different vehicle recognition unit 74 recognizes both the front vehicle Af and the rear vehicle Ab, the control switching unit 78 permits the start of the autonomous traveling control without the periphery monitoring obligation. That is, in the control switching unit 78, the recognition of both the front vehicle Af and the rear vehicle Ab by the different vehicle recognition unit 74 is included in the condition for starting the autonomous traveling control at the traffic congestion level 3.

On the other hand, the control switching unit 78 can permit the continuation of the autonomous traveling control as long as the recognition of the front vehicle Af continues even when the recognition of the rear vehicle Ab is interrupted after the transition to the autonomous traveling control. That is, the control switching unit 78 does not satisfy the condition for canceling the autonomous traveling control due to only the interruption of the recognition of the rear vehicle Ab by the different vehicle recognition unit 74. Hereinafter, a plurality of scenes, in which the control switching unit 78 suspends the cancellation of the autonomous traveling control at the traffic congestion level 3 even when the rear vehicle Ab is not detected, will be sequentially described below.

<First Scene: Continuation of Traffic Congestion Level 3 During Non-Low-Speed Traveling>

The control switching unit 78 changes, according to the travel speed of the current subject vehicle Am, the determination of whether to permit the continuation of traffic congestion level 3 when the recognition of the rear vehicle Ab is interrupted after the transition to the traffic congestion level 3 autonomous traveling control. The travel speed is acquired by the vehicle information acquisition unit 73.

When the travel speed of the subject vehicle Am exceeds a predetermined speed threshold (for example, about 50 km/h), the control switching unit 78 more relaxes the cancellation condition based on the interruption of the recognition of the rear vehicle Ab than the condition when the travel speed is less than the speed threshold.

As described above, in the "First Scene" where the travel speed of the subject vehicle Am exceeds the speed threshold (is equal to or greater than the speed threshold), the control switching unit 78 determines to continue the traffic congestion level 3 even when no detection of the rear vehicle Ab occurs. On the other hand, when the travel speed of the subject vehicle Am is less than the speed threshold, the control switching unit 78 determines to end the traffic congestion level 3 based on the non-detection of the rear vehicle Ab when other conditions are satisfied.

Here, when the subject vehicle Am is traveling in the permission area, the control switching unit 78 can switch the control state from the traffic congestion level 3 to the area level 3. Therefore, when the travel speed of the subject vehicle Am exceeds the speed threshold and the rear vehicle Ab is not detected, the control switching unit 78 shifts to the area level 3 to maintain the autonomous traveling control without the periphery monitoring obligation.

<Second Scene: Continuation of Traffic Congestion Level 3 after Restart>

The control switching unit 78 recognizes whether the subject vehicle Am stops and restarts after the transition to the traffic congestion level 3. When the subject vehicle Am restarts, the control switching unit 78 more relaxes the cancellation condition based on the interruption of recognition of the rear vehicle Ab than when the subject vehicle Am does not restart. As described above, in the "Second Scene" where the subject vehicle Am stopped and restarted, the control switching unit 78 determines to continue the traffic congestion level 3 even when no detection of the rear vehicle Ab occurs. On the other hand, when the subject vehicle Am did not stop and restart, the control switching unit 78 determines to end the traffic congestion level 3 based on the non-detection of the rear vehicle Ab when other conditions are satisfied.

In the above "Second Scene", the subject vehicle Am and the rear vehicle Ab repeatedly stop and start due to the traffic congestion. Therefore, there is a possibility that the restart of the rear vehicle Ab will be greatly delayed with respect to the subject vehicle Am. In such a case, a space (hereinafter referred to as a subject-to-rear vehicle distance db) between the subject vehicle Am and the rear vehicle Ab may occur, and the traffic congestion level 3 may be canceled regardless of the driver intention. With respect to such a situation, the above-described process of ignoring non-detection of the rear vehicle Ab after the restart is effective in avoiding cancellation of the traffic congestion level 3 due to the start delay of the rear vehicle Ab.

<Third Scene: Continuation of Traffic Congestion Level 3 Based on Recognition of Lane Change>

The different vehicle recognition unit 74 recognizes the lane change of the rear vehicle Ab to the adjacent lane Lna after the shift to the traffic congestion level 3. Then, the control switching unit 78 determines to continue traffic congestion level 3 in "Third Scene" when the recognition of the rear vehicle Ab is interrupted due to the lane change to the adjacent lane Lna. As described above, even when the rear vehicle Ab temporarily becomes undetected (does not exist) due to the lane change of the rear vehicle Ab, the vehicle continues to travel at the traffic congestion level 3.

Here, when the state in which the rear vehicle Ab is not recognized continues for a predetermined time (for example, about 5 to 10 seconds), the control switching unit 78 determines to end the traffic congestion level 3. As a result, when no rear vehicle Ab appears instead of the different vehicle that has moved to the adjacent lane Lna, the control switching unit 78 transitions the travel control state from the traffic congestion level 3 to the driving assistance control.

<Fourth Scene: Continuation of Traffic Congestion Level 3 Based on Recognition of Road Shape>

The road information recognition unit 75 recognizes a road shape of the road on which the subject vehicle Am travels after the transition to the traffic congestion level 3. Then, according to the road shape recognized by the road information recognition unit 75, specifically, the curvature and road gradient, the control switching unit 78 changes the determination of whether to permit the continuation of traffic congestion level 3 when the recognition of the rear vehicle Ab is interrupted.

More specifically, when the curvature of the curved section of the road on which the vehicle is traveling is large, the periphery monitoring sensor 30 is likely to lose the rear vehicle Ab even in the case where the rear vehicle Ab actually exists. Similarly, when the curvature of the gradient and the gradient change of the road on which the vehicle is traveling is large, the periphery monitoring sensor 30 is likely to lose the rear vehicle Ab even in the case where the rear vehicle Ab actually exists. Therefore, the curvature of the curve and the road gradient that increase the probability of non-detection by the periphery monitoring sensor 30 can be set in advance according to the rear detection performance of the periphery monitoring sensor 30.

When the curvature of curve of the road on which the vehicle is traveling exceeds a preset curvature threshold, the control switching unit 78 determines to continue the traffic congestion level 3 even when the rear vehicle Ab is not detected. Similarly, when the gradient of the road on which the vehicle is traveling exceeds a preset gradient threshold, the control switching unit 78 determines to continue the traffic congestion level 3 even when the rear vehicle Ab is not detected. As described above, in "Fourth Scene" in which the rear vehicle Ab is temporarily undetected due to the road shape, it is possible to continue the autonomous traveling control at the traffic congestion level 3. However, even after the curvature of the curve or the road gradient becomes less than the threshold value, when the non-recognition state of the rear vehicle Ab continues, the control switching unit 78 ends the autonomous traveling control at the traffic congestion level 3. The curvature threshold and the gradient threshold may be set as thresholds independent of each other, or may be set as a composite threshold.

<Fifth Scene: Continuation of Traffic Congestion Level 3 Based on Traffic Congestion Continuation Estimation>

The traffic congestion recognition unit 76 recognizes the traffic congestion around the subject vehicle Am even after the transition to the traffic congestion level 3. When the traffic congestion in the periphery of the subject vehicle Am is recognized by the traffic congestion recognition unit 76, the control switching unit 78 permits continuation of the autonomous traveling control even when the recognition of the rear vehicle Ab is interrupted. Then, even in a case where the recognition of the rear vehicle Ab is interrupted, the traffic congestion recognition unit 76 determines the traffic congestion continuation on a condition that the side vehicle As traveling in the adjacent lane Lna has been detected, a condition that the traffic congestion information has been received by the in-vehicle communication device 39, or the like. As described above, even in "Fifth Scene" where the traffic congestion is estimated to continue, temporary non-detection caused by the delay in starting or lane change of the rear vehicle Ab is not reflected in the cancellation of traffic congestion level 3. As a result, the traffic congestion level 3 is likely to be continue until the traffic congestion in the periphery of the subject vehicle is resolved. When the state in which the rear vehicle Ab is not recognized continues for a predetermined time (for example, about 5 to 10 seconds), the autonomous traveling control at the traffic congestion level 3 ends.

Next, hereinafter, the driving control switching process will be described with reference to FIGS. 5 to 8 in addition to FIGS. 1 to 4 together with the traffic congestion determination process and the traffic congestion solving determination process. In the driving control switching process, the switching between the driving assistance control and the traffic congestion level 3 is executed.

Figure 5:
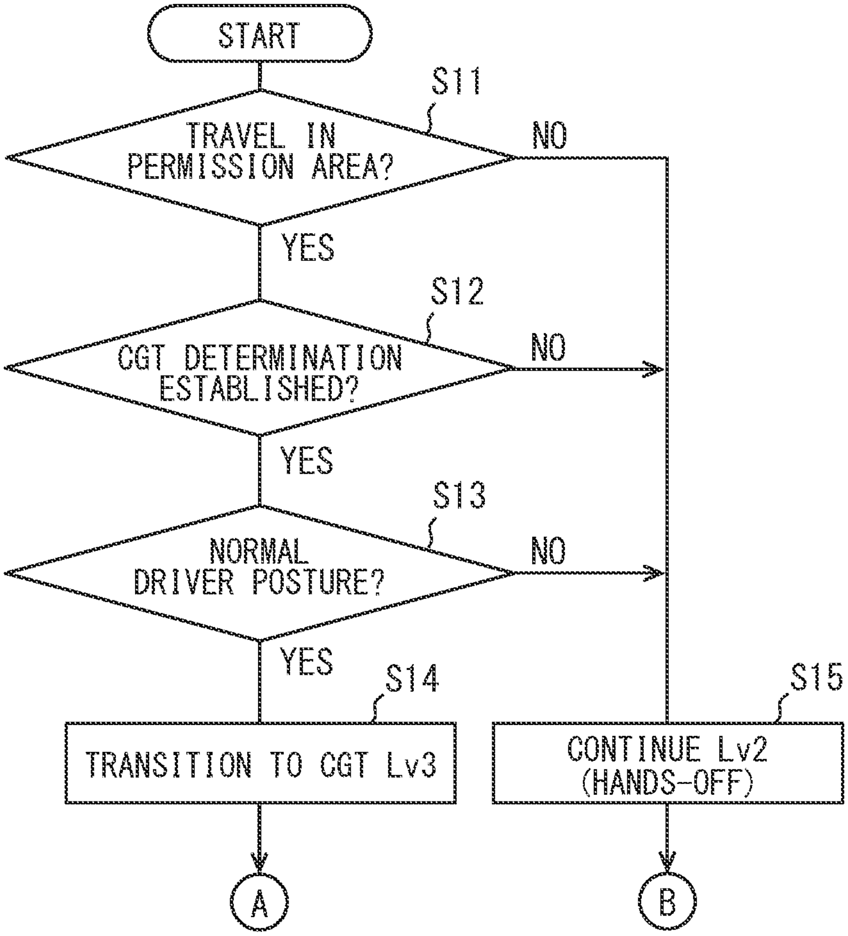
FIG. 5 is a flowchart showing details of a driving control switching process executed by the automated driving ECU together with FIG. 6.
Figure 6:
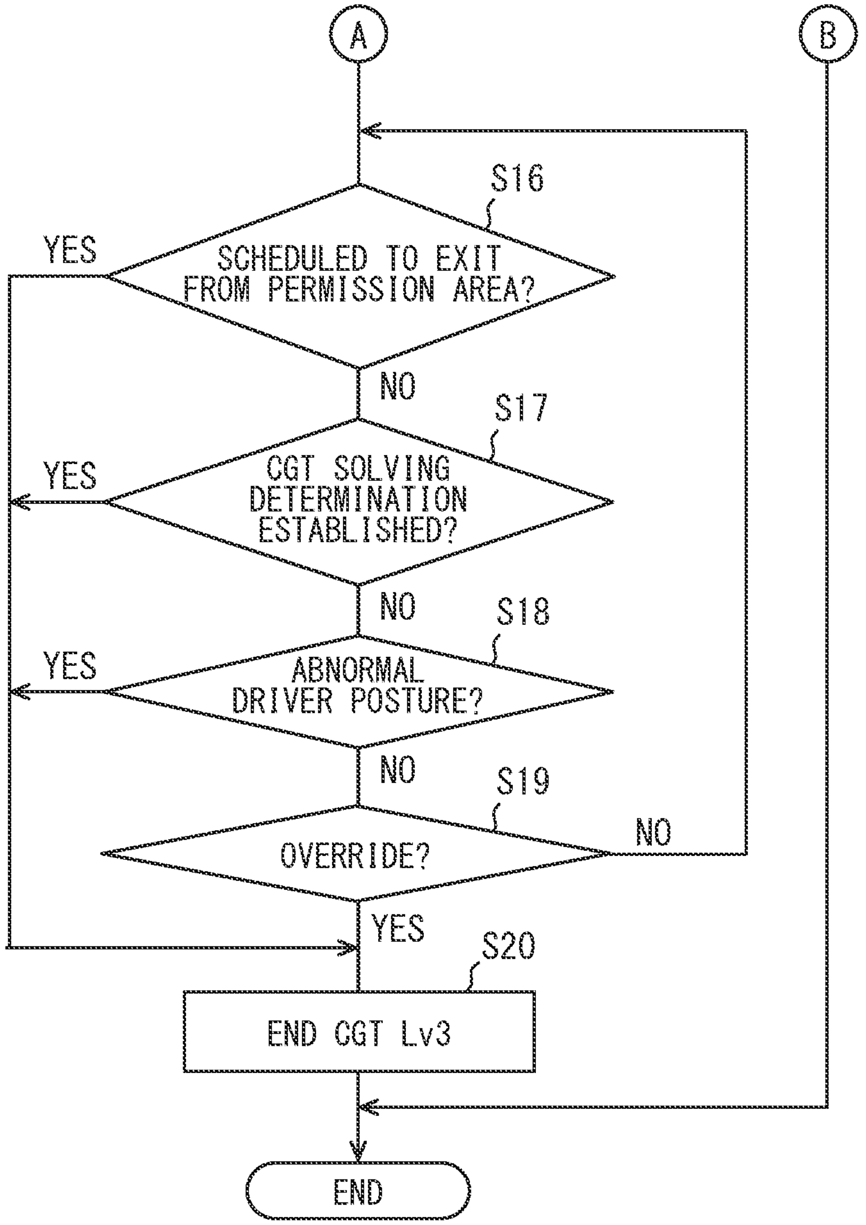
FIG. 6 is a flowchart showing details of the driving control switching process together with FIG. 5.
Figure 7:
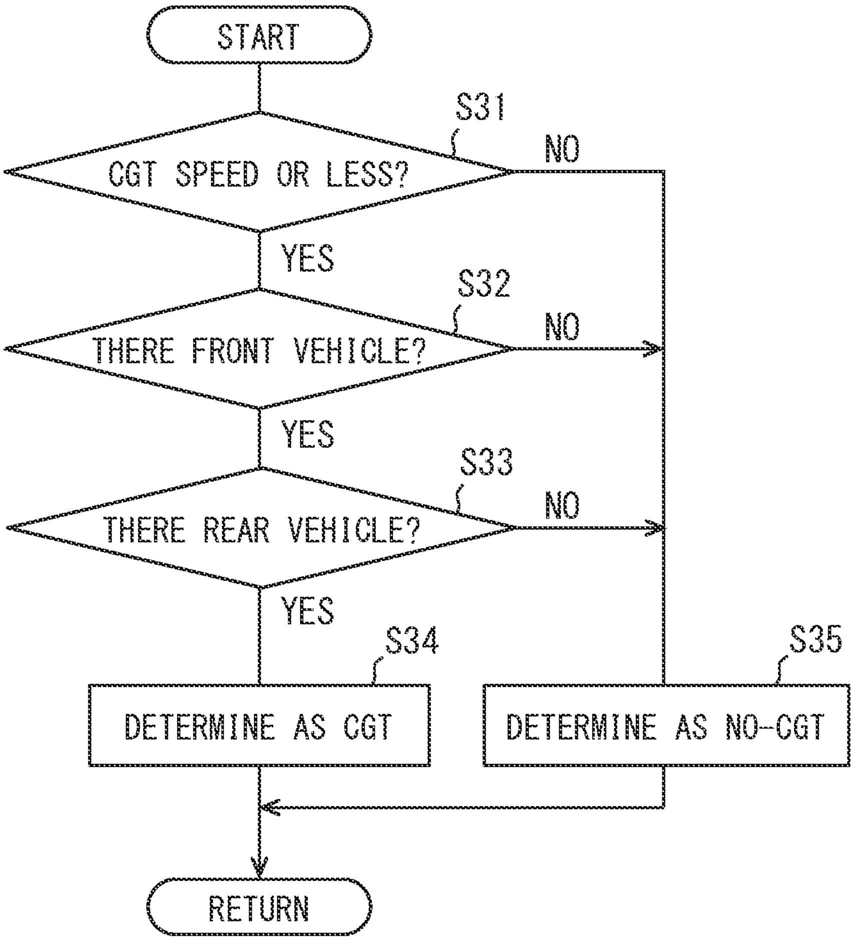
FIG. 7 is a flowchart showing the details of a traffic congestion determination process executed by the automated driving ECU.
Figure 8:
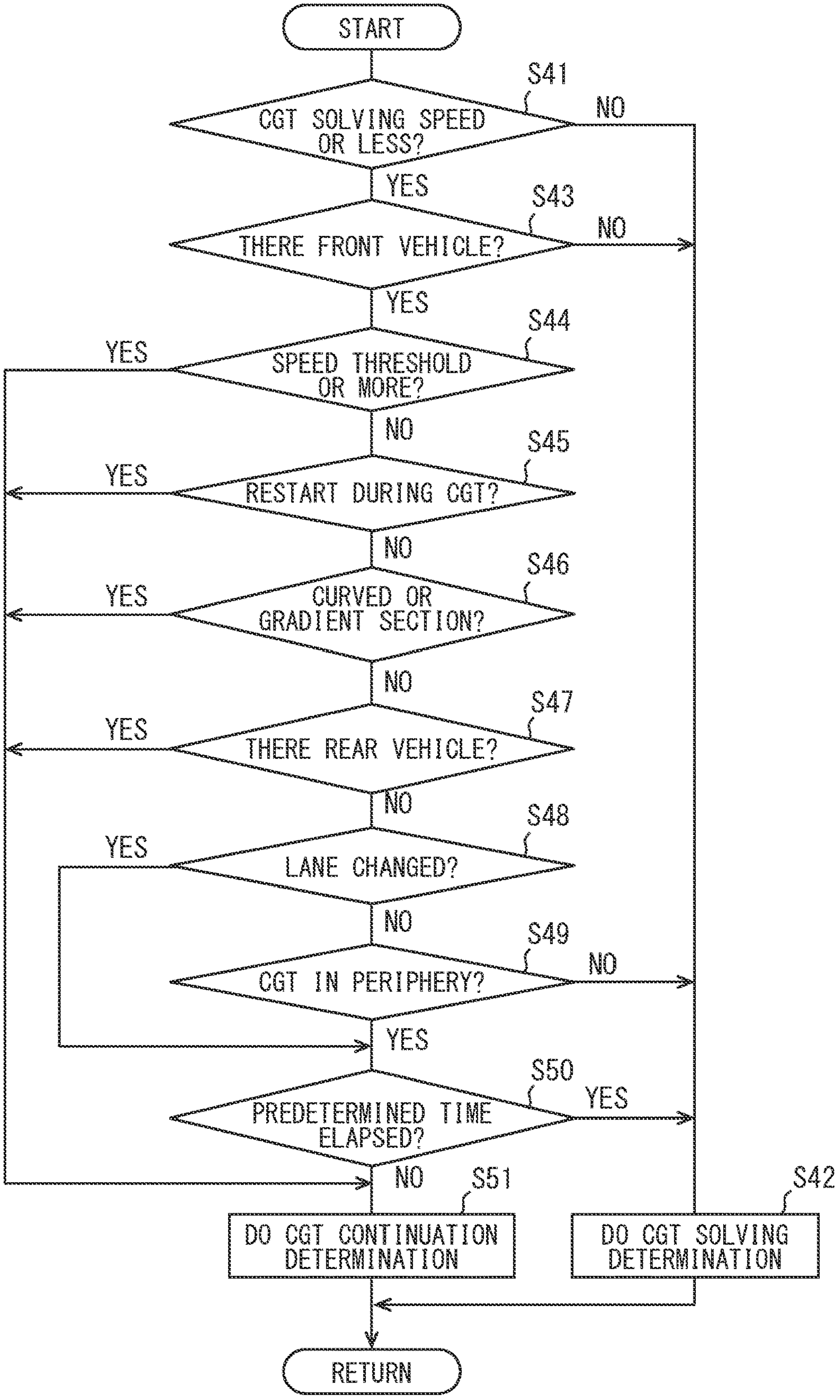
FIG. 8 is a flowchart showing the details of a traffic congestion solving determination process executed by the automated driving ECU.

The control switching unit 78 mainly starts the driving control switching process shown in FIGS. 5 and 6 based on the recognition of a level 3 transition operation by the HMI information acquisition unit 71. Similarly, the traffic congestion determination process shown in FIG. 7 is started mainly by the traffic congestion recognition unit 76 based on the recognition of the transition operation to the level 3, and is repeated until the transition to the traffic congestion level 3 is performed. On the other hand, the traffic congestion solving determination process shown in FIG. 8 is started mainly by the traffic congestion recognition unit 76 based on the transition to the traffic congestion level 3, and is repeated until the transition to the driving assistance control is performed.

In S11 of the driving control switching process shown in FIGS. 5 and 6, it is determined whether the road on which the subject vehicle Am travels is within the permission area or the limited permission area. When it is determined in S11 that the vehicle is traveling in the non-permission area, the process proceeds to S15 to continue the hands-off traveling which is the level 2 driving assistance control. On the other hand, when it is determined in S11 that the vehicle is traveling in the permission area or the limited permission area, the process proceeds to S12.

In S12, it is determined whether the traffic congestion determination is established based on the traffic congestion determination process (see FIG. 7). When it is determined in S12 that the traffic congestion determination is not established, the process proceeds to S15, and the level 2 driving assistance control is continued. On the other hand, when it is determined in S12 that the traffic congestion determination is established, the process proceeds to S13.

In S13, it is determined whether the driver is in a normal driving posture. When it is determined in S13 that the driver posture is out of the range of the normal driving posture, the transition to the traffic congestion level 3 is prohibited. In this case, the process proceeds to S15 to continue the level 2 driving assistance control or end the driving assistance control. On the other hand, when it is determined in S13 that the driver is in the normal driving posture, the process proceeds to S14 to perform the transition to the traffic congestion level 3.

After the transition to the traffic congestion level 3, in S16, an exit schedule from the permission area or the limited permission area is recognized. When it is determined in S16 that there is a schedule to exit from the permission area or the like, the process proceeds to S20. In S20, the transition to the hands-on traveling, which is the level 2 driving assistance control, is performed. On the other hand, when it is determined in S16 that there is no schedule to exit from the permission area or the like, the process proceeds to S17.

In S17, it is determined whether the traffic congestion solving determination is established based on the traffic congestion solving determination process (see FIG. 8). When it is determined in S17 that the traffic congestion solving determination is established, the process proceeds to S20. In S20, the transition to the hands-on traveling, which is the level 2 driving assistance control, is performed. On the other hand, when it is determined in S17 that the traffic congestion solving determination is not established, the process proceeds to S18.

In S18, similarly to S13, it is determined whether the driver is in a normal driving posture. When it is determined in S18 that a current posture of the driver is the posture that is not permitted at the traffic congestion level 3, the process proceeds to S20. In S20, the transition to the hands-on traveling, which is the level 2 driving assistance control, is performed. For example, when a backrest of the driver seat is reclined largely backward, or when a seatbelt is unfastened, the traffic congestion level 3 is canceled. On the other hand, when it is determined in S18 that the driver posture is within the permissible range for the traffic congestion level 3, the process proceeds to S19.

In S19, it is determined whether there is an override operation by the driver. When it is determined in S19 that the override operation has been performed by the driver, the process proceeds to S20, the traffic congestion level 3 ends, and the switching to manual driving is performed. On the other hand, when it is determined in S19 that the override operation has not been performed, the process returns to S16. By repeating the above S16 to S19, the traffic congestion level 3 is continued.

In S31 of the traffic congestion determination process shown in FIG. 7, it is determined whether the current travel speed of the subject vehicle Am is equal to or less than the traffic congestion speed (for example, about 10 km/h). When it is determined in S31 that the travel speed of the subject vehicle Am exceeds the traffic congestion speed, the process proceeds to S35 to execute a no-traffic congestion determination. In this case, since the traffic congestion determination is not established, the condition for starting the traffic congestion level 3 is also not satisfied. On the other hand, when it is determined in S31 that the travel speed of the subject vehicle Am is equal to or lower than the traffic congestion speed, the process proceeds to S32.

In S32, it is determined whether the front vehicle Af traveling in the subject vehicle lane Lns is recognized. When it is determined in S32 that the front vehicle Af is not recognized, the process proceeds to S35 to execute the no-traffic congestion determination. Based on the above, the condition for starting the traffic congestion level 3 is not satisfied. On the other hand, when it is determined in S32 that the front vehicle Af is recognized, the process proceeds to S33.

In S33, it is determined whether the rear vehicle Ab traveling in the subject vehicle lane Lns is recognized. When it is determined in S33 that the rear vehicle Ab is not recognized, the process proceeds to S35 to execute the no-traffic congestion determination. Even in this case, the condition for starting the traffic congestion level 3 is not satisfied. On the other hand, when it is determined in S33 that the rear vehicle Ab is recognized, the process proceeds to S34 to execute the traffic congestion determination. Based on the traffic congestion determination in S34, the condition for starting the autonomous traveling control at the traffic congestion level 3 is satisfied.

In S41 of the traffic congestion solving determination process shown in FIG. 8, it is determined whether the current travel speed of the subject vehicle Am exceeds a traffic congestion solving speed (for example, about 60 km/h). When it is determined in S41 that the travel speed of the subject vehicle Am exceeds the traffic congestion solving speed, the process proceeds to S42 to execute the traffic congestion solving determination. In this case, the condition for canceling the traffic congestion level 3 is satisfied. On the other hand, when it is determined in S41 that the travel speed of the subject vehicle Am is equal to or lower than the traffic congestion solving speed, the process proceeds to S43.

In S43, it is determined whether the front vehicle Af traveling in the subject vehicle lane Lns is recognized. When it is determined in S43 that the front vehicle Af is not recognized, the process proceeds to S42 to execute the traffic congestion solving determination. As described above, the end condition of the traffic congestion level 3 is satisfied. On the other hand, when it is determined in S43 that the front vehicle Af is recognized, the process proceeds to S44.

In S44, it is determined whether the scene corresponds to the "First Scene" described above. Specifically, in S44, it is determined whether the traveling speed of the subject vehicle Am is equal to or higher than a predetermined speed threshold. When it is determined in S44 that the traveling speed of the subject vehicle Am is equal to or higher than the speed threshold, the process proceeds to S51 to determine whether the traffic congestion continues. In this case, since the traffic congestion solving determination is not established, the condition for canceling the traffic congestion level 3 is also not satisfied. As described above, in "First Scene", the traffic congestion level 3 is continued even when no detection of the rear vehicle Ab occurs. On the other hand, when it is determined in S44 that the travel speed of the subject vehicle Am is lower than the predetermined threshold, the process proceeds to S45.

In S45, it is determined whether the scene corresponds to the "Second Scene" described above. Specifically, in S45, it is determined whether the vehicle has stopped and restarted in the traffic congestion. When it is determined in S45 that the subject vehicle Am has restarted, the process proceeds to S51 to perform the traffic congestion continuation determination. Even in this case, since the traffic congestion solving determination is not established, the condition for canceling the traffic congestion level 3 is not satisfied. As described above, in "Second Scene", the traffic congestion level 3 is continued even when no detection of the rear vehicle Ab occurs. On the other hand, in S45, when it is determined that the subject vehicle Am does not restart, the process proceeds to S46.

In S46, it is determined whether the scene corresponds to the "Fourth Scene" described above. Specifically, in S46, it is determined whether the vehicle is traveling in the curve section of which curvature exceeds the curvature threshold value or the gradient section of which gradient exceeds the gradient threshold value. In S46, it is determined that the vehicle is traveling on the road that exceeds the curvature threshold value or the gradient threshold value, the process proceeds to S51 to perform the traffic congestion continuation determination. Even in this case, the condition for canceling the traffic congestion level 3 is not satisfied. As described above, in "Fourth Scene", the traffic congestion level 3 is continued even when no detection of the rear vehicle Ab occurs. On the other hand, in S46, when it is determined that neither the curvature threshold nor the gradient threshold is exceeded, the process proceeds to S47.

In S47, it is determined whether the rear vehicle Ab traveling in the subject vehicle lane Lns is recognized. When it is determined in S47 that the rear vehicle Ab is recognized, the process proceeds to S51 to execute the traffic congestion continuation determination. On the other hand, when it is determined in S47 that the rear vehicle Ab is not recognized, the process proceeds to S48.

In S48, it is determined whether the scene corresponds to the "Third Scene" described above. Specifically, in S48, it is determined whether the lane change of the rear vehicle Ab has been recognized. In S48, it is determined that the rear vehicle Ab has changed the lane immediately before the current time, it is determined that the current scene corresponds to "Third Scene", and the process proceeds to S50. On the other hand, in S48, when it is determined that the rear vehicle Ab did not change the lane immediately before the current time, the process proceeds to S49.

In S49, it is determined whether the scene corresponds to "Fifth Scene" described above. Specifically, in S49, the traffic congestion situation in the periphery of the subject vehicle Am is checked. When it is determined in S49 that the periphery of the subject vehicle is not congested, the process proceeds to S42 to execute the traffic congestion solving determination. On the other hand, in S49, when it is determined that there is the traffic congestion in peripheral of the subject vehicle, it is determined that the situation corresponds to "Fifth Scene", and the process proceeds to S50.

In S50, it is determined whether the elapsed time after the rear vehicle Ab is lost exceeded the predetermined time. In S50, when it is determined that the continuation time after the rear vehicle Ab is lost has exceeded the predetermined time, the process proceeds to S42 to perform the traffic congestion solving determination. As described above, the condition for canceling the traffic congestion level 3 is established, and the transition to the hands-on driving assistance control is performed (see S20). On the other hand, in S50, when it is determined that the elapsed time after the rear vehicle Ab is lost is equal to or less than the predetermined time, the process proceeds to S51 to perform the traffic congestion continuation determination. Based on the traffic congestion continuation determination in S51, the continuation of the autonomous traveling control at the traffic congestion level 3 becomes possible.

In the first embodiment described above, the continuation of the autonomous traveling control is permitted by recognizing both of the front vehicle Af and the rear vehicle Ab. Even when the recognition of the rear vehicle Ab is interrupted, the continuation is permitted. In this way, when the condition for canceling the autonomous traveling control is relaxed rather than the condition for starting the autonomous traveling control, it becomes easier for the autonomous traveling control without the periphery monitoring obligation to be continued. Accordingly, it is possible to improve the user convenience for the automated driving.

In addition, in the first embodiment, in the control switching unit 78, the recognition of both the front vehicle Af and the rear vehicle Ab by the different vehicle recognition unit 74 is included in the condition for starting the autonomous traveling control. On the other hand, the control switching unit 78 does not satisfy the condition for canceling the autonomous traveling control due to only the interruption of the recognition of the rear vehicle Ab by the different vehicle recognition unit 74. As described above, after the transition to traffic congestion level 3, a rear end collision with the rear vehicle Ab becomes lower than before the transition. Therefore, even when the requirements for the rear vehicle Ab are reduced, a driver anxiety is less likely to be caused. In addition, by relaxing the conditions for canceling the autonomous traveling control, the autonomous traveling control is likely to be continued. Therefore, it is possible to reliably improve the convenience of automated driving.

Further, in the first embodiment, the vehicle information acquisition unit 73 acquires the travel speed of the subject vehicle Am. Then, the control switching unit 78 changes, according to the travel speed, the determination of whether to permit the continuation of the autonomous traveling control when the recognition of the rear vehicle Ab is interrupted after the transition to the autonomous traveling control. The travel speed is acquired by the vehicle information acquisition unit 73. According to the above, it is possible to improve convenience without impairing the user's sense of safety because the continuation or cancellation of the autonomous traveling control is determined in consideration of the rear end collision risk that increases or decreases according to the travel speed.

Furthermore, when the travel speed exceeds a predetermined value, the control switching unit 78 of the first embodiment more relaxes the condition for canceling the autonomous traveling control based on the interruption of recognition of the rear vehicle Ab than when the travel speed is less than the predetermined value. Specifically, when the travel speed exceeds a predetermined value (in other words, equal to or greater than a predetermined value), the control switching unit 78 continues the autonomous traveling control even when the recognition of the rear vehicle Ab by the different vehicle recognition unit 74 is interrupted.

As described above, as the travel speed of the subject vehicle Am and the rear vehicle Ab become higher, the subject-to-rear vehicle distance db from the subject vehicle Am to the rear vehicle Ab increases. Therefore, the non-detection of the rear vehicle Ab by the periphery monitoring sensor 30 is likely to occur. Thereby, the interruption of the recognition of the rear vehicle Ab by the different vehicle recognition unit 74 is likely to occur. Considering such a situation, in a case where the travel speed of the subject vehicle Am exceeds a predetermined value, it is determined to continue the autonomous traveling control even when the recognition of the rear vehicle Ab is interrupted. As a result, even when the rear detection capability of the periphery monitoring sensor 30 is lower than the front detection capability, the autonomous traveling control is appropriately continued. Therefore, it is possible to ensure user convenience.

In addition, according to the first embodiment, the control switching unit 78 recognizes whether the subject vehicle Am stops and restarts after the transition to the autonomous traveling control. Then, when the subject vehicle Am restarts, the control switching unit 78 more relaxes the condition for canceling the autonomous traveling control based on the interruption of recognition of the rear vehicle Ab than when the subject vehicle Am does not restart. Specifically, the control switching unit 78 continues the autonomous traveling control when the rear vehicle Ab is not detected after the subject vehicle Am restarts.

According to the above, when the vehicle travels at low speed in the traffic congestion, the cancellation of the autonomous traveling control due to interruption of recognition of the rear vehicle Ab is less likely to occur. Therefore, even in a traffic congestion scene in which the vehicle repeatedly stops and restarts, the driving control state with the periphery monitoring obligation can continue. As the result, it is possible to further improve the user convenience for the automated driving.

Further, the different vehicle recognition unit 74 of the first embodiment recognizes the lane change of the rear vehicle Ab to the adjacent lane Lna. Then, the control switching unit 78 determines to continue the autonomous traveling control when the recognition of the rear vehicle Ab is interrupted due to the lane change to the adjacent lane Lna. According to the above, the cancellation of the autonomous traveling control due to temporary non-detection of the rear vehicle Ab due to the lane change is less likely to occur. As the result, it is possible to further improve the convenience of the automated driving.

Further, in the first embodiment, the road shape of the road on which the subject vehicle Am travels is recognized by the road information recognition unit 75. Then, the control switching unit 78 changes, according to the road shape, the determination of whether to permit the continuation of the autonomous traveling control when the recognition of the rear vehicle Ab is interrupted after the transition to the autonomous traveling control. The road shape is recognized by the road information recognition unit 75. According to the above, even in a scene in which the rear vehicle Ab is temporarily undetected due to, for example, a curve shape or the road gradient, the autonomous traveling control without the periphery monitoring obligation can continue. As the result, it is possible to further improve the user convenience for the automated driving.

In addition, in the first embodiment, the traffic congestion in the periphery of the subject vehicle Am is recognized by the traffic congestion recognition unit 76. Then, when the state in the periphery of the subject vehicle Am is recognized by the traffic congestion recognition unit 76, the control switching unit 78 permits continuation of the autonomous traveling control even when the recognition of the rear vehicle Ab is interrupted. According to the above, during a period when the traffic congestion in the periphery of the subject vehicle continues, it becomes difficult for the autonomous traveling control to be canceled due to the temporary non-detection of the rear vehicle Ab. As a result, the state without the periphery monitoring obligation is likely to continue until the vehicle gets out of the traffic congestion. Therefore, it is possible to further improve the user convenience for the automated driving.

Further, in the first embodiment, the control switching unit 78 determines to cancel the autonomous traveling control when the interruption of the recognition of the rear vehicle Ab continues for a predetermined time or longer. According to the above, while avoiding cancellation of the autonomous traveling control based on factors such as the performance of the periphery monitoring sensor 30, the behavior of the rear vehicle Ab, the traveling environment, and the like, in a scene where the rear vehicle Ab is certainly absent, the autonomous traveling control is stably canceled. According to the above, it is possible to reduce the collision risk with the rear vehicle Ab and improve the user convenience with the high standard.

In the above-described first embodiment, the automated driving ECU **50*b* corresponds to an "automated driving control device", the road information recognition unit 75** corresponds to an "road shape recognition unit", and the subject vehicle lane Lns corresponds to a "lane", and the adjacent lane Lna corresponds to a "different lane".

Second Embodiment

A second embodiment according to the present disclosure is a modification of the first embodiment. As shown in FIGS. 1 to 4, also in the second embodiment, as in the first embodiment, both the front vehicle Af and the rear vehicle Ab traveling in the subject vehicle lane Lns are recognized by the different vehicle recognition unit 74. According to the recognition or no recognition of the front vehicle Af and the rear vehicle Ab by the different vehicle recognition unit 74, the control switching unit 78 determines to start and cancel the traffic congestion level 3 autonomous traveling control based the driving control switching process (FIGS. 5 and 6).

Figure 9:
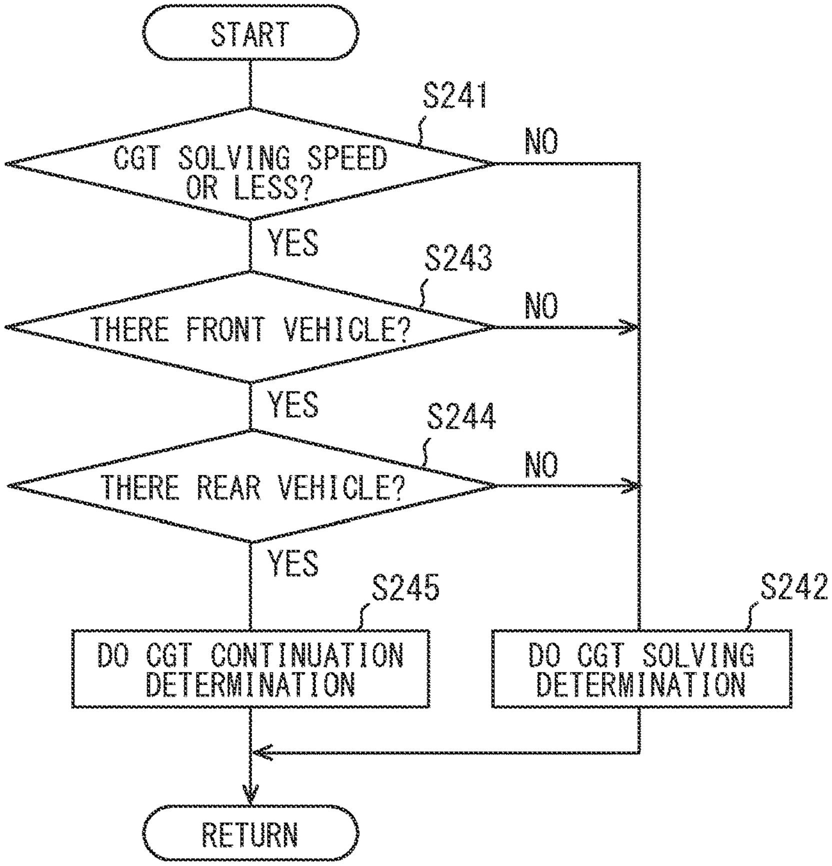
FIG. 9 is a flowchart showing the details of a traffic congestion solving determination process executed by the automated driving ECU according to a second embodiment.

The traffic congestion solving determination process of the second embodiment (see FIG. 9) is different from the traffic congestion solving determination process of the first embodiment (see FIG. 8). When the travel speed of the subject vehicle Am exceeds the traffic congestion solving speed (S241: NO), the traffic congestion recognition unit 76 determines that the traffic congestion is resolved (S242). In addition, the traffic congestion recognition unit 76 determines that the congestion is resolved (S242) even when the front vehicle Af is recognized (S243: NO) and when the rear vehicle Ab is not recognized (S244: NO). As described above, the condition for canceling the traffic congestion level 3 is established, and the transition to the driving assistance control from the traffic congestion level 3 is performed (FIG. 6, see S20).

On the other hand, when the traveling speed of the subject vehicle Am is equal to or lower than the traffic congestion solving speed (S241: YES) and both the front vehicle Af and the rear vehicle Ab are recognized (S243 and S244: YES), the traffic congestion recognition unit 76 determines the continuation of the traffic congestion (S245). In this case, since the condition for canceling the traffic congestion level 3 is not satisfied, the vehicle continues to travel under the autonomous traveling control without the periphery monitoring obligation.

Figure 10:
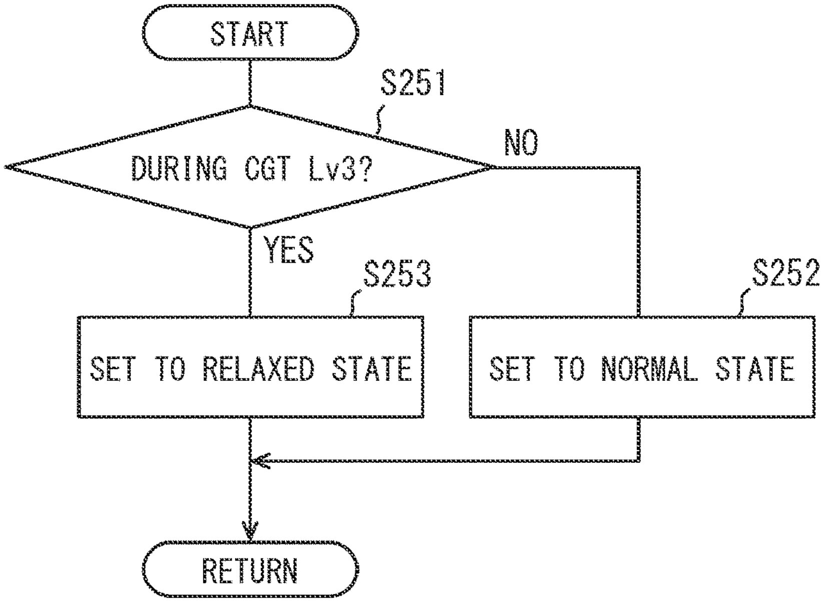
FIG. 10 is a flowchart showing details of a rear vehicle recognition standard change process executed by a traffic congestion recognition unit.

Furthermore, in the second embodiment, the recognition condition for recognizing the different vehicle behind the subject vehicle as the rear vehicle Ab is changed according to the execution of the autonomous traveling control. The different vehicle recognition unit 74 changes the condition so that the rear vehicle Ab can be recognized more easily after the start of the traffic congestion level 3, based on the rear vehicle recognition standard change process (see FIG. 10). Specifically, the different vehicle recognition unit 74 determines whether the traffic congestion level 3 is being executed (S251). When the traffic congestion level 3 is not being executed (S251: NO), the different vehicle recognition unit 74 set the standard for recognizing the rear vehicle Ab to the normal state (S252). On the other hand, when the traffic congestion level 3 is being executed (S251: YES), the different vehicle recognition unit 74 sets the standard for recognizing the rear vehicle Ab to a state relaxed than the normal state (S253).

The different vehicle recognition unit 74 expands the subject-to-rear vehicle distance db (see FIG. 4) to the different vehicle recognized as the rear vehicle Ab, for example, by relaxing the recognition condition (recognition standard). Thereby, the different vehicle recognition unit 74 recognizes, as the rear vehicle Ab, a different vehicle further behind the subject vehicle Am as compared with the recognition in the normal state. Specifically, in the relaxed state, the different vehicle recognition unit 74 recognizes, as the rear vehicle Ab, a different vehicle that is small or unclear in a captured image by the camera unit 31 capturing the rear area and is not recognized as the rear vehicle Ab in the normal state. Similarly, in the relaxed state, the different vehicle recognition unit 74 recognizes, as the rear vehicle Ab, a moving object that is detected by the millimeter wave radar 32. The millimeter wave radar has a detection range that is the rear area. In the rear area, the moving object is not recognized as the rear vehicle Ab in the normal state.

In the second embodiment described above, the condition for recognizing the different vehicle to be recognized as the rear vehicle Ab after the start of the traffic congestion level 3. Therefore, it becomes difficult to cancel the autonomous traveling control at the traffic congestion level 3 when no detection of the rear vehicle Ab occurs. According to the above, it becomes easier to continue the autonomous traveling control without the periphery monitoring obligation. Therefore, it is possible to improve the user convenience of automated driving.

Third Embodiment

The third embodiment of the present disclosure is a modification of the first embodiment. In the automated driving system 50 of the third embodiment shown in FIGS. 1 to 3, two level 3 transition operations are required to transition from the driving assistance control to the autonomous traveling control.

A first level 3 transition operation (hereinafter referred to as level 3 activation operation) corresponds to an activation operation for providing a transition instruction from the driving assistance control to the autonomous traveling control. The automated driving ECU **50*b* starts the driving control switching process (see FIGS. 11 and 6) based on the recognition of the level 3 activation operation by the HMI information acquisition unit 71**. The level 3 activation operation is substantially the same as the level 3 transition operation of the first embodiment.

The second level 3 transition operation (hereinafter referred to as level 3 start operation) corresponds to a trigger operation for providing a start instruction of the autonomous traveling control. In the first embodiment, the input of the level 3 start operation is omitted. The automated driving ECU **50*b* starts traveling under the autonomous traveling control (traffic congestion level 3) based on the recognition of the level 3 start operation by the HMI information acquisition unit 71**.

As described above, in the case where the control switching unit 78 detects the input of the level 3 activation operation by the driver, when the condition for starting the autonomous traveling control is satisfied and when the input of the level 3 start operation is further detected, the traveling control state is switched from the driving assistance control to the traffic congestion level 3. In the third embodiment, as in the first embodiment, the condition for starting the traffic congestion level 3 is set to be stricter than the condition for canceling it, and includes the recognition of both the front vehicle Af (see FIG. 4) and the rear vehicle Ab (see FIG. 4). However, after the start condition is satisfied and the start of the traffic congestion level 3 is permitted, even when the rear vehicle Ab becomes undetected prior to the driver input of the level 3 start operation, the control switching unit 78 executes a transition to the traffic congestion level 3 by the level 3 start operation.

Hereinafter, details of the driving control switching process and traffic congestion determination process of the third embodiment performed by the control switching unit 78 will be described based on FIGS. 11 and 12 and with reference to FIGS. 6 and 1 to 4. The contents of S311 to S313, S317, and S318 in the driving control switching process are substantially the same as the contents of S11 to S15 (see FIG. 5) of the first embodiment. Further, the contents of S331, S332, and S334 to S336 in the traffic congestion determination operation are substantially the same as the contents of S31 to S35 (see FIG. 5) of the first embodiment.

Figure 11:
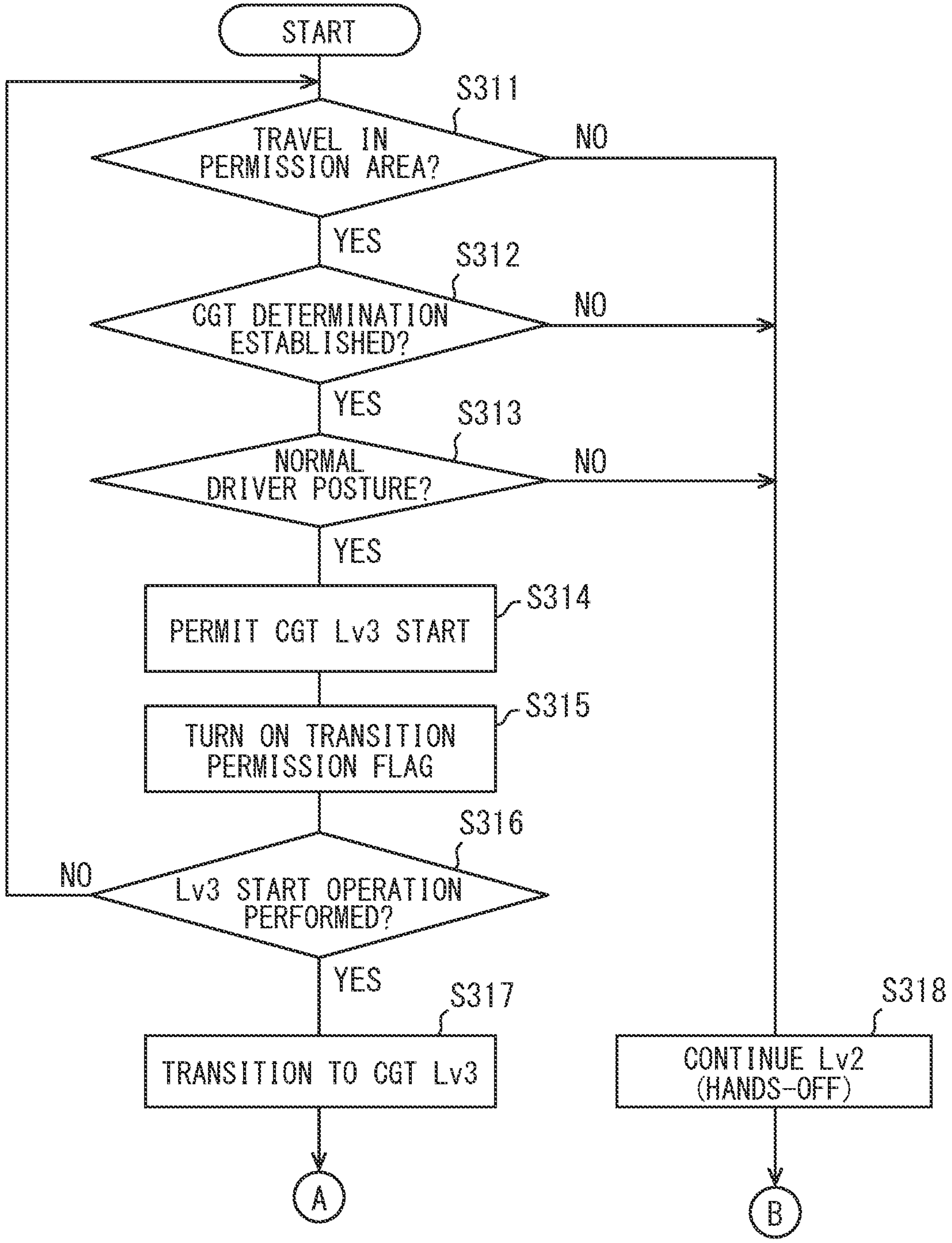
FIG. 11 is a flowchart showing details of a driving control switching process according to a third embodiment together with FIG. 6.
Figure 12:
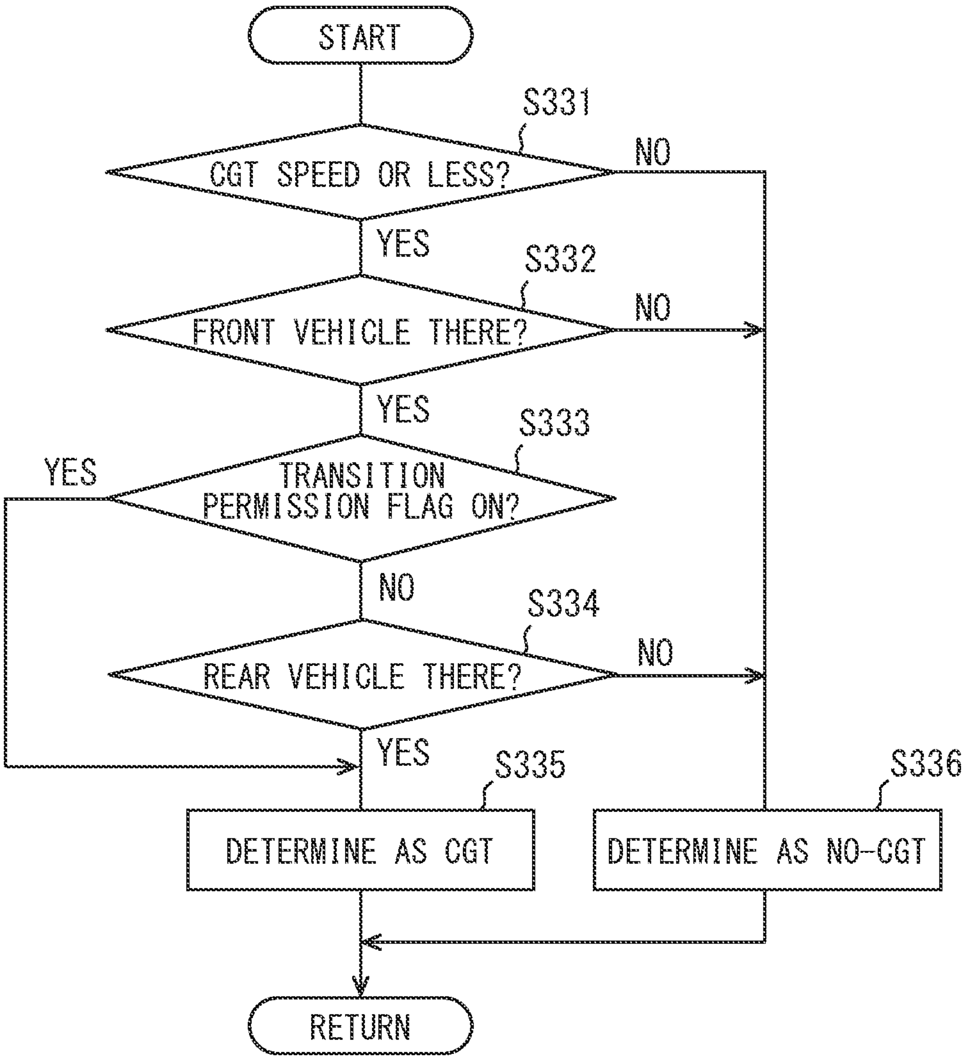
FIG. 12 is a flowchart showing details of a traffic congestion determination process.

When it is determined, in S311 to S313 of the driving control switching process shown in FIG. 11, that the condition for starting the traffic congestion level 3 is satisfied, the control switching unit 78 permits the transition to the traffic congestion level 3 in S314. Further, in S315, the control switching unit 78 turns on a flag (hereinafter referred to as a transition permission flag) indicating that the transition to the traffic congestion level 3 is permitted. When the transition permission flag is turned on, the condition for establishing the traffic congestion determination is changed in the traffic congestion determination process shown in FIG. 12.

Specifically, in S333 of the traffic congestion determination process, it is determined whether the transition permission flag is in the on-state. When the transition permission flag is in the off-state, it is determined in S334 whether the rear vehicle Ab is recognized. As described above, when the transition permission flag is in the off-state, the traffic congestion determination is performed in S335 only when both the front vehicle Af and the rear vehicle Ab are detected. On the other hand, when the transition permission flag is in the on-state, the determination of the rear vehicle Ab in S334 is skipped. Therefore, even when the rear vehicle Ab is not detected after the transition permission flag is turned on, the traffic congestion determination in S335 continues.

In S316 of the driving control switching process shown in FIG. 11, the control switching unit 78 determines whether the HMI information acquisition unit 71 has recognized the level 3 start operation by the driver. In S316, when it is determined that the level 3 start operation has been performed, the control switching unit 78 transitions the control to the traffic congestion level 3 in S317. On the other hand, when it is determined in S316 that there is no level 3 start operation, the start condition is re-determined through S311 to S313. At this time, even when the rear vehicle Ab becomes undetected by switching the transition permission flag to the off-state, the traffic congestion determination continues (S312: YES). The control switching unit 78 continues to determine whether there is the level 3 start operation in S316 based on continued satisfaction of the start condition. Thereby, even in the case where the recognition of the rear vehicle Ab is interrupted before the level 3 start operation is performed, the control switching unit 78 starts the traffic congestion level 3 in S317, when the level 3 start operation by the driver is recognized.

Even in the third embodiment described above, the same effects as in the first embodiment can be obtained, and it is possible to improve the user convenience of automated driving. More specifically, in the third embodiment, after the condition for starting traffic congestion level 3 is once satisfied, the non-detection of the rear vehicle Ab is ignored during an input waiting period for the level 3 start operation. Therefore, the level 3 start operation is accepted, and the probability of being able to start the traffic congestion level 3 increases. Therefore, it is possible to ensure the user convenience even in the automated driving system 50 that requires multiple user operations to start the traffic congestion level 3.

In addition, in the third embodiment, the level 3 start operation corresponds to a "start instruction operation".

Fourth Embodiment

Figure 13:
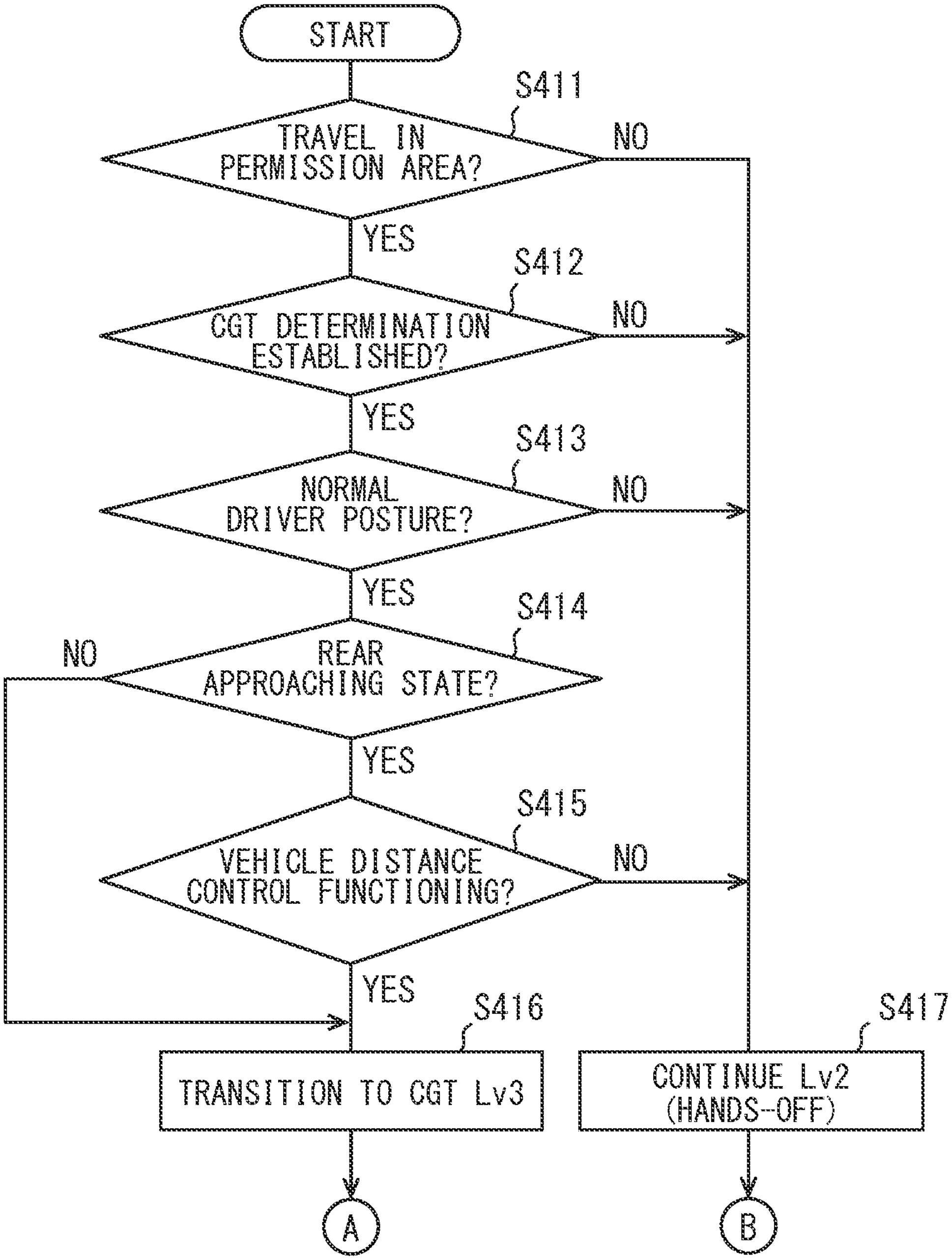
FIG. 13 is a flowchart showing details of a driving control switching process according to a fourth embodiment together with FIG. 6.

A fourth embodiment of the present disclosure is further another modification of the first embodiment. In the driving control switching process of the fourth embodiment shown in FIG. 13, as in the first embodiment detected above, when both the front vehicle Af and the rear vehicle Ab are detected (S412: YES), the autonomous traveling control (traffic congestion level 3) is permitted to start. However, in the fourth embodiment, when the rear vehicle Ab is excessively close to the subject vehicle Am, in other words, when the rear vehicle Ab is suspected of tailgating, the start of the traffic congestion level 3 is not permitted. Hereinafter, details of the driving control switching process of the fourth embodiment will be described based on FIG. 13 with reference to FIGS. 1 to 4. The contents of S411 to S413, S415, and S416 in the driving control switching process are substantially the same as the contents of S11 to S15 (see FIG. 5) of the first embodiment.

The different vehicle recognition unit 74 determines an approaching state of the front vehicle Ab to the subject vehicle Am based on the subject-to-rear vehicle distance db (see FIG. 4) from the subject vehicle Am to the rear vehicle Ab (S414). The different vehicle recognition unit 74 is set with an approaching threshold (for example, about several meters in a traffic congestion) and a predetermined time (for example, about 5 seconds) for estimating the tailgating. The approaching threshold and the predetermined time may be preset constant values, or may be adjusted according to the travel speed of the subject vehicle Am. In addition, the approaching threshold and predetermined time may be preadjustable based on the user operation. The different vehicle recognition unit 74 determines that the rear vehicle Ab is in the approaching state when the state in which the subject-to-rear vehicle distance db is less than the approaching threshold continues for more than a predetermined time.

When the different vehicle recognition unit 74 determines that the rear vehicle Ab is in the approaching state (S414: YES), it determines whether a vehicle distance control is functioning in the rear vehicle Ab (S415). For example, the different vehicle recognition unit 74 continuously refers to the detection information of the rear vehicle Ab, and recognizes the acceleration-deceleration state of the rear vehicle Ab based on the transition of the subject-to-rear vehicle distance db. The different vehicle recognition unit 74 determines that the vehicle distance control is functioning when it can be estimated that the driving assistance control (ACC) or the autonomous traveling control is continuously operating based on the acceleration-deceleration state of the rear vehicle Ab.

When the different vehicle recognition unit 74 determines that the rear vehicle Ab is not in the approaching state (S414: NO), the control switching unit 78 performs the transition to the traffic congestion level 3 (S416). In addition, even in a case where it is determined that the rear vehicle Ab is in the approaching state (S414: YES), when it is determined that the vehicle distance control is functioning in the rear vehicle Ab (S415: YES), the transition to the traffic congestion level 3 is performed (S416). On the other hand, when it is determined that the rear vehicle Ab is close to the subject vehicle Am (S414: YES) and the vehicle distance control is not functioning in the rear vehicle Ab (S415: NO), the control switching unit 78 does not permit the start of the traffic congestion level 3. In this case, the control switching unit 78 continues the traveling under the level 2 driving assistance control (S417).

Even in the fourth embodiment described above, the same effects as in the first embodiment can be obtained, and it is possible to improve the user convenience of automated driving. More specifically, in the fourth embodiment, when the rear vehicle Ab is excessively close to the subject vehicle Am, the start of traffic congestion level 3 is not permitted. Therefore, it is possible to avoid a situation in which the autonomous traveling control starts in a state where the rear vehicle Ab is suspected of tailgating. According to the above, the interruption of the autonomous traveling control caused by the behavior of the rear vehicle Ab is avoided. Therefore, it is possible to ensure the user convenience.

In addition, in the fourth embodiment, it is determined that the rear vehicle Ab is in the approaching state when the state in which the subject-to-rear vehicle distance db is less than the approaching threshold continues for more than a predetermined time. Therefore, for example, in a scene in which the rear vehicle Ab temporarily approaches the subject vehicle Am due to the deceleration of the subject vehicle Am immediately after entering a traffic congestion section, it is difficult to determine that the rear vehicle Ab is in the approaching state. According to the above, since an erroneous determination of tailgating can be avoided, even in the automated driving system 50 that does not permit the start of traffic congestion level 3 in the case of tailgating, the user convenience becomes impaired.

Further, in the fourth embodiment, it is estimated whether the vehicle distance control by ACC or the like is functioning in the rear vehicle Ab. Then, even when the rear vehicle Ab is close to the subject vehicle Am, the start of traffic congestion level 3 is permitted when the vehicle distance control is functioning in the rear vehicle Ab. According to the above, when the vehicle is not tailgating and there is substantially no risk of a rear-end collision with the rear vehicle Ab due to the implementation of the vehicle distance control, it is possible to avoid the limit of the start of traffic congestion level 3 due to the approach of the rear vehicle Ab. Accordingly, even in the automated driving system 50 that does not permit the start of traffic congestion level 3 in the case of tailgating, the user convenience becomes impaired.

Fifth Embodiment

Figure 14:
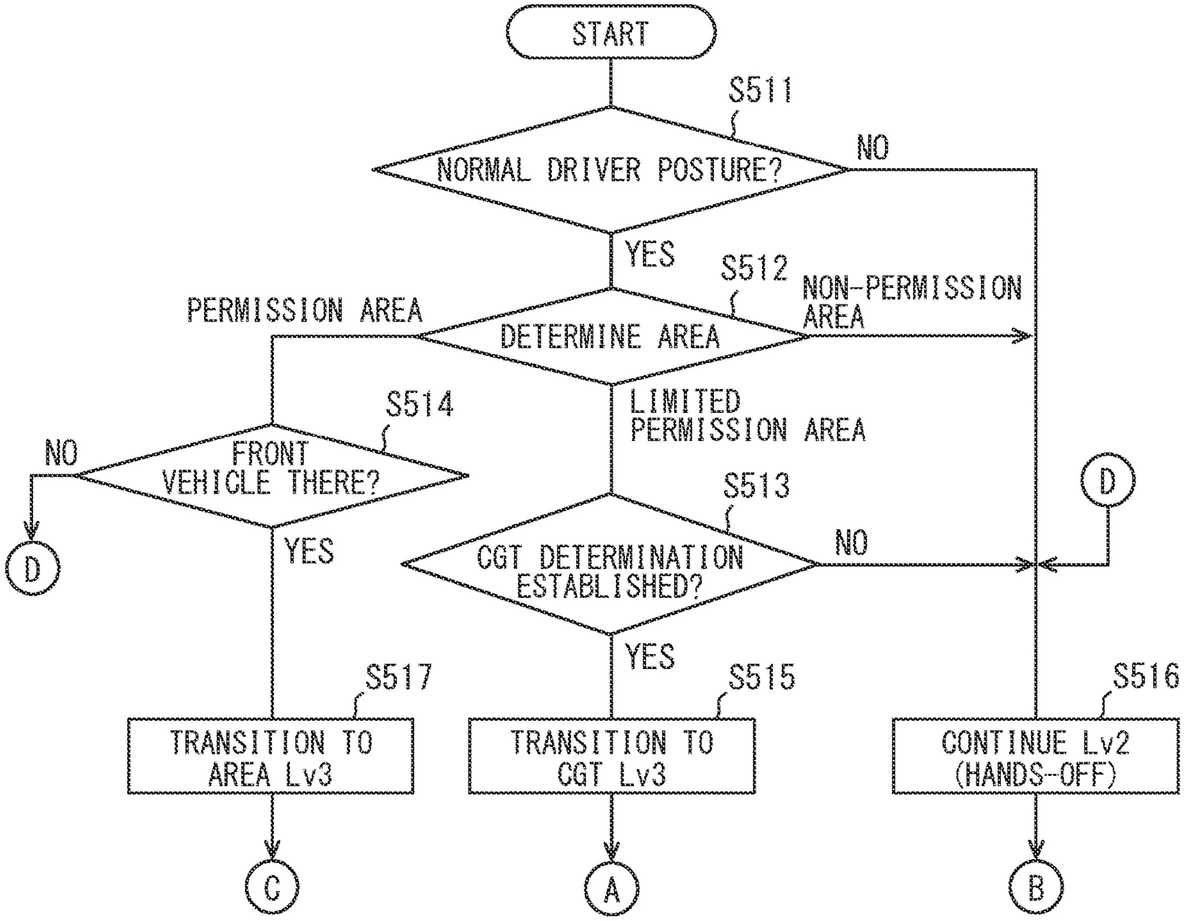
FIG. 14 is a flowchart showing details of a driving control switching process according to a fifth embodiment together with FIGS. 6 and 15.
Figure 15:
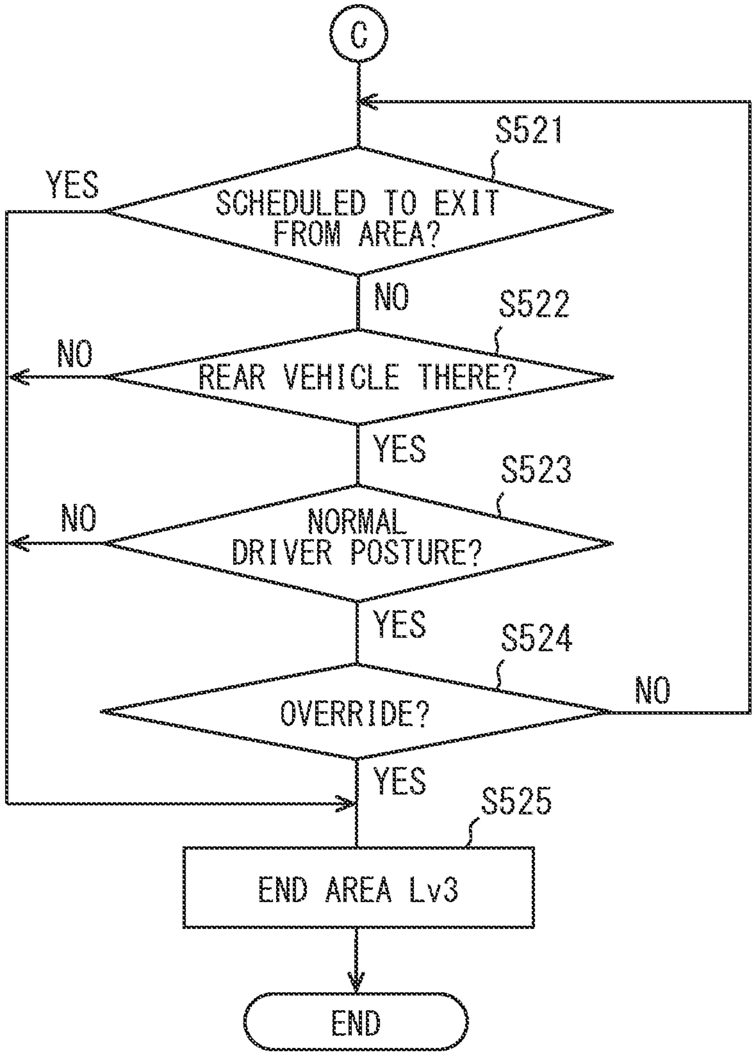
FIG. 15 is a flowchart showing details of the driving control switching process together with FIGS. 6 and 14.

A fifth embodiment of the present disclosure is further another modification of the first embodiment. In the driving control switching process of the fifth embodiment shown in FIGS. 14 and 15, the start of area level 3 is permitted in addition to the start of traffic congestion level 3. Hereinafter, details of the driving control switching process of the fifth embodiment will be described based on FIGS. 14 and 15 with reference to FIG. 6 and FIGS. 1 to 4.

In S511 of the driving control switching process, based on the posture information recognized by the HMI information acquisition unit 71, it is determined whether the driver is in a normal driving posture. When it is determined in S511 that the driver posture is out of the range of the normal driving posture, the control switching unit 78 prohibits the transition to the autonomous traveling control, and determines to continue the driving assistance control in S516. On the other hand, when it is determined in S511 that the driver is in the normal driving posture, the road information recognition unit 75 determines the area of the road on which the subject vehicle Am travels in S512.

When it is determined in S512 that the subject vehicle Am is traveling in the non-permission area, the control switching unit 78 prohibits the traveling with the autonomous traveling control, and in S516 determines to continue the driving assistance control. On the other hand, when it is determined that the subject vehicle Am is traveling in the limited permission area, the control switching unit 78 determines in S513 whether the traffic congestion determination by the traffic congestion recognition unit 76 (see S34 in FIG. 7) is established. When the traffic congestion determination is not established, the control switching unit 78 determines continuation of the driving assistance control in S516. On the other hand, when the traffic congestion determination is established, that is, when both the front vehicle Af and the rear vehicle Ab are recognized by the different vehicle recognition unit 74, the control switching unit 78 performs the transition to the traffic congestion level 3 in S515.

Here, even in a case where the rear vehicle Ab is not detected after the transition to the traffic congestion level 3 (FIG. 8 S47: NO), when a predetermined condition is satisfied, the traffic congestion continuation determination is performed (FIG. 8, S51). Therefore, the control switching unit 78 can permit the continuation of the traffic congestion level 3 based on the traffic congestion continuation determination (FIG. 6, S17: NO) even when the recognition of the rear vehicle Ab is interrupted. Further, when the non-detection time of the rear vehicle Ab is within a predetermined time (for example, several seconds to ten-odd seconds), the different vehicle recognition unit 74 may avoid determining that the recognition of the rear vehicle Ab has been interrupted. That is, the different vehicle recognition unit 74 may determine that the recognition of the rear vehicle Ab has been interrupted when the non-detection of the rear vehicle Ab continues for more than a predetermined time.

Further, when it is determined in S512 that the subject vehicle Am is traveling in the permission area, the control switching unit 78 causes the different vehicle recognition unit 74 to determine whether both the front vehicle Af and the rear vehicle Ab have been recognized in S514. In the case of traveling in the permission area, the predetermined distance to the different vehicle recognized as the front vehicle Af and the rear vehicle Ab is set to be longer than a predetermined distance to the different vehicle recognized as the front vehicle Af and the rear vehicle Ab in the traffic congestion determination process (see FIG. 7). When at least one of the front vehicle Af or the rear vehicle Ab is not recognized in S514, the control switching unit 78 determines the continuation of the driving assistance control in S516. On the other hand, when both the front vehicle Af and the rear vehicle Ab are recognized, the control switching unit 78 performs the transition to the area level 3 in S517. The detection determination of the front vehicle Af and the rear vehicle Ab in S514 may be omitted. In this case, the control switching unit 78 performs the transition to the area level 3 based on the determination that the vehicle is traveling in the permission area.

At S521 after the transition to the area level 3, the control switching unit 78 recognizes the exit schedule from the permission area. When there is a schedule to leave the permission area, the control switching unit 78 determines to end (cancel) the area level 3 in S525. On the other hand, when there is no plan to leave the permission area, the control switching unit 78 determines in S522 whether the different vehicle recognition unit 74 continues to recognize the rear vehicle Ab. When the recognition of the rear vehicle Ab is interrupted, the control switching unit 78 determines to end the area level 3 in S525. In this case, the control switching unit 78 performs the transition to the hands-on driving assistance control or manual driving. On the other hand, when the rear vehicle Ab continues to be recognized, the control switching unit 78 permits the continuation of the area level 3 until the driver abnormal posture or override operation is detected in S523 and S524.

Also, in S522, when the non-detection time of the rear vehicle Ab is within a predetermined time, the different vehicle recognition unit 74 avoids determining that the recognition of the rear vehicle Ab has been interrupted. That is, the different vehicle recognition unit 74 determines that the recognition of the rear vehicle Ab has been interrupted when the non-detection time of the rear vehicle Ab continues for more than a predetermined time.

In the fifth embodiment described above, as in the first embodiment, the condition for canceling the traffic congestion level 3 is relaxed, and even when the recognition of the rear vehicle Ab is interrupted, the continuation of the congestion level 3 is permitted. Therefore, even when the traffic congestion level 3 and the area level 3 can be implemented as the autonomous traveling control, the same effects as in the first embodiment can be obtained, and it is possible to improve the user convenience of the automated driving.

In addition, in the fifth embodiment described above, the permission area where the area level 3 is permitted corresponds to a "specific area".

Sixth Embodiment

A sixth embodiment according to the present disclosure is a modification of the fifth embodiment. Also in the sixth embodiment, the autonomous traveling control performed by the automated driving ECU 50*b* also includes the traffic congestion level 3 and the area level 3. The control switching unit 78 determines to cancel the traffic congestion level 3 when the recognition of the rear vehicle Ab is interrupted after the transition to the traffic congestion level 3. On the other hand, the control switching unit 78 permits the continuation of area level 3 even when the recognition of the rear vehicle Ab is interrupted after the transition to the area level 3.

More specifically, in the traffic congestion solving determination process (see FIG. 8) of the sixth embodiment, the process of S47 for determining whether the rear vehicle Ab has been recognized is omitted. On the other hand, in S43, it is determined whether both the front vehicle Af and the rear vehicle have been recognized. When it is determined in S43 that the recognition of at least one of the front vehicle Af or the rear vehicle Ab has been interrupted, the traffic congestion recognition unit 76 performs the traffic congestion solving determination in S42. As a result, when the recognition of the rear vehicle Ab is interrupted after the transition to the traffic congestion time level 3, the control switching unit 78 determines to end (cancel) the traffic congestion level 3 in S20 based on the traffic congestion solving determination in S17 of the driving control switching process (see FIG. 6). In this case, the control switching unit 78 performs the transition to the hands-on driving assistance control or manual driving. Also, in the sixth embodiment, the different vehicle recognition unit 74 does not determine that the recognition of the rear vehicle Ab is interrupted based on only the non-detection of the rear vehicle Ab. When the non-detection time of the rear vehicle Ab continues for more than the predetermined time, the different vehicle recognition unit 74 may determine that the recognition of the rear vehicle Ab has been interrupted.

Further, in the driving control switching process (see FIGS. 14 and 15) of the sixth embodiment, the process of S514 for recognizing the front vehicle Af and the rear vehicle Ab and the process of S522 for determining the recognition continuation of the rear vehicle Ab are omitted As a result, after the transition to the area level 3, the control switching unit 78 can permit the continuation of area level 3 regardless of whether the rear vehicle Ab is recognized.

In the sixth embodiment described above, the condition for canceling the area level 3 is relaxed with respect to the condition for canceling the traffic congestion level 3. Even when the recognition of the rear vehicle Ab is interrupted, the continuation of the area level 3 is permitted. As the result, even in the sixth embodiment described above, the same effects as in the first and fifth embodiments and the like can be obtained, and it is possible to improve the user convenience of automated driving.

Other Embodiments

Although multiple embodiments of the present disclosure have been described above, the present disclosure is not construed as being limited to the above-described embodiments, and can be applied to various embodiments and combinations within a range that does not depart from the spirit of the present disclosure.

In the above-described second embodiment as well, in each scene corresponding to "First Scene" to "Fifth Scene" in the first embodiment, a process of relaxing the condition for recognizing the rear vehicle Ab may be executed. For example, in the first modification of the second embodiment described above, the different vehicle recognition unit 74 relaxes the recognition condition of the rear vehicle Ab when the travel speed of the subject vehicle Am exceeds the predetermined speed threshold after the transition to the traffic congestion level 3. Further, in the second modification of the second embodiment described above, the different vehicle recognition unit 74 relaxes the recognition condition of the rear vehicle Ab when the subject vehicle Am stopped and restarted after the transition to the traffic congestion level 3.

Further, in the third modification of the second embodiment described above, the different vehicle recognition unit 74 relaxes the recognition condition of the rear vehicle Ab when the lane change by the rear vehicle Ab to the adjacent lane Lna has been recognized after the transition to the traffic congestion level 3. In addition, in the fourth modification of the second embodiment described above, the different vehicle recognition unit 74 relaxes the recognition condition of the rear vehicle Ab when the curvature or the gradient of the traveling road exceeds each preset threshold after the transition to the traffic congestion level 3. Further, in the fifth modification of the second embodiment described above, the different vehicle recognition unit 74 relaxes the recognition condition of the rear vehicle Ab when the continuation of the traffic congestion in the periphery of the subject vehicle is estimated after the transition to the traffic congestion level 3.

In the above-described first embodiment, the traffic congestion solving determination process is constructed so that the traffic congestion continuation determination is made in a plurality of presumed scenes. On the other hand, the traffic congestion solving determination process may be simplified as compared with the first embodiment. In addition, among the start conditions and the end conditions of the traffic congestion level 3 and the area level 3, conditions other than those related to recognizing the front vehicle Af and the rear vehicle Ab may be changed as appropriate.

For example, in a sixth modification of the first embodiment, the presence or absence of the rear vehicle Ab is not reflected in the traffic congestion solving determination. Further, in a seventh modification of the above-described embodiment, the predetermined time limit is omitted, and even when the continuation of the non-detection of the rear vehicle Ab exceeds the predetermined time, the traffic congestion solving determination is not performed.

Further, only one scene determination is performed in each of eighth and ninth modifications of the first embodiment. Specifically, the control switching unit 78 of the eighth modification executes the continuation process of the traffic congestion level 3 even when the rear vehicle Ab becomes undetected in a case where the travel speed of the subject vehicle Am exceeds the predetermined speed threshold after the start of the traffic congestion level 3. On the other hand, when the travel speed of the subject vehicle Am is lower than the predetermined speed threshold value and the rear vehicle Ab becomes unrecognized, the control switching unit 78 executes the traffic congestion level 3 interruption process.

In addition, the control switching unit 78 of the ninth modification, after the traffic congestion level 3 starts, in the case where the subject vehicle Am stops and then restarts, even when the rear vehicle Ab becomes undetected, the continuation of the traffic congestion level 3 is determined. On the other hand, after the traffic congestion level 3 starts, when the subject vehicle Am continues to travel without stopping, the control switching unit 78 cancels the traffic congestion level 3 based on the non-detection of the rear vehicle Ab.

In a tenth modification of the fourth embodiment, when the rear vehicle Ab is suspected of the tailgating, in addition to the control for avoiding the start of traffic congestion level 3, the control for determining the cancelation of the traffic congestion level 3 is performed. According to the above, it is possible for the driver to move away from the rear vehicle Ab, which may be suspected of the tailgating, based on the driver determination. Further, the information as to whether the vehicle distance control is functioning in the rear vehicle Ab may be acquired through inter-vehicle communication or the like. Furthermore, the determination of whether the vehicle distance control is functioning may be omitted.

Each function of the driving assistance ECU 50*a* and the automated driving ECU 50*b* of an eleventh modification of the above embodiments is provided by one automated driving ECU. That is, the functions of the driving assistance ECU 50*a* are installed in the automated driving ECU 50*b* of the eleventh modification.

Further, in a twelfth modification of the above embodiments, the functions of the driving assistance ECU 50*a*, the automated driving ECU 50*b*, and the HCU 100 are provided by one integrated ECU. In such an eleventh modification, the integrated ECU corresponds to an "automated driving control device". Further, the functions of the automated driving control device according to the present disclosure may be implemented through cooperation between the automated driving ECU 50*b* and the HCU 100. In such a configuration, the system including the automated driving ECU and the HCU 100 corresponds to the "automated driving control device".

In the above embodiments and modifications, the respective functions provided by the automated driving ECU and the HCU can be also provided by software and hardware for executing the software, only software, only hardware, and complex combinations of software and hardware. Further, in a case where these functions are provided by electronic circuits as hardware, the functions can be also provided by analog circuits or digital circuits which include a large number of logic circuits.

Each of the processing units of the above-described embodiments may be individually mounted on a printed circuit board, or may be mounted on an ASIC (Application Specific Integrated Circuit), a FPGA, or the like. The configuration of the storage medium (non-transitory tangible computer-readable storage medium or non-transitory tangible storage medium) that stores various program may be changed as appropriate. Further, the storage medium is not limited to the configuration provided on the circuit board, and may be provided in the form of a memory card or the like. The storage medium may be inserted into a slot portion, and electrically connected to the control circuit of the automated driving ECU or the control circuit of the HCU. Further, the storage medium may include an optical disk which forms a source of programs to be copied into the automated driving ECU or the HCU, or a hard disk drive therefor.

The automated driving system and the vehicle equipped with the HMI system is not limited to a general private car, but may be a rented vehicle, a vehicle for man-driving taxi, a vehicle for sharing vehicle service, a freight vehicle, a bus, or the like. Further, the automated driving system and the vehicle equipped with the HMI system may be a right-hand drive vehicle (in other words, vehicle with a steering wheel positioned on the right side) or a left-hand drive vehicle (in other words, vehicle with a steering wheel positioned on the left side). Further, the traffic environment in which the vehicle travels may be a traffic environment premised on left-hand traffic, or may be a traffic environment premised on right-hand traffic. The automated driving control and the information presentation according to the present disclosure may be appropriately optimized according to the road traffic law of each country and region, the steering wheel position of the vehicle, and the like.

The controller and the method thereof described in the present disclosure may be implemented by a special purpose computer which includes a processor programmed to execute one or more functions implemented by computer programs. Alternatively, the device and the method described in the present disclosure may be implemented by a special purpose hardware logic circuit. Alternatively, the device and the method described in the present disclosure may be implemented by one or more special purpose computers configured by a combination of a processor executing a computer program and one or more hardware logic circuits. The computer program may be stored in a computer readable non-transitory tangible storage medium as computer-executable instructions.

Here, the process of the flowchart or the flowchart described in this application includes a plurality of sections (or steps), and each section is expressed as, for example, S11. Further, each section may be divided into several subsections, while several sections may be combined into one section. Furthermore, each section thus configured may be referred to as a device, module, or means.

The invention claimed is:

1. An automated driving control device configured to enable traveling of a subject vehicle by an automated driving function, the automated driving control device comprising:

at least one of (i) a circuit and (ii) a processor with a memory storing computer program code executable by the processor, the at least one of the circuit and the processor configured to cause the automated driving control device to:

recognize a front vehicle and a rear vehicle that travel in a lane same as a subject vehicle lane where the subject vehicle travels;

permit a start of an autonomous traveling control without a periphery monitoring obligation by a driver of the subject vehicle when having recognized both the front vehicle and the rear vehicle; and permit a continuation of the autonomous traveling control even when having interrupted a recognition of the rear vehicle after transition to the autonomous traveling control, wherein recognition of both of the front vehicle and the rear vehicle is included in a start condition of the autonomous traveling control, and the at least one of the circuit and the processor is further configured to cause the automated driving control device not to satisfy a cancellation condition for canceling the autonomous traveling control due to only an interruption of the recognition of the rear vehicle.

2. The automated driving control device according to claim 1, wherein the at least one of the circuit and the processor is further configured to cause the automated driving control device to start the autonomous traveling control based on a start instruction operation by the driver after permitting a start of the autonomous traveling control based on the recognition of both of the front vehicle and the rear vehicle, and start the autonomous traveling control based on the start instruction operation even when the recognition of the rear vehicle is interrupted until the start instruction operation is performed after permitting the start of the autonomous traveling control.

3. The automated driving control device according to claim 1, wherein the at least one of the circuit and the processor is further configured to cause the automated driving control device to acquire a travel speed of the subject vehicle, and change a determination of whether to permit the continuation of the autonomous traveling control according to the travel speed acquired, when the recognition of the rear vehicle is interrupted after the transition to the autonomous traveling control.

4. The automated driving control device according to claim 3, wherein when the travel speed exceeds a predetermined value, a cancelation condition for canceling the autonomous traveling control based on an interruption of the recognition of the rear vehicle as compared with a cancelation condition when the travel speed is less than the predetermined value is more relaxed.

5. The automated driving control device according to claim 1, wherein the at least one of the circuit and the processor is further configured to cause the automated driving control device to recognize whether the subject vehicle stopped and restarted after the transition to the autonomous traveling control, and when the subject vehicle restarted, a cancelation condition for canceling the autonomous traveling control based on an interruption of the recognition of the rear vehicle than a cancelation condition when the subject vehicle does not restart is more relaxed.

6. The automated driving control device according to claim 1, wherein the at least one of the circuit and the processor is further configured to cause the automated driving control device to recognize a road shape of a road where the subject vehicle travels, and change a determination of whether to permit the continuation of the autonomous traveling control according to the road shape recognized, when the recognition of the rear vehicle is interrupted after the transition to the autonomous traveling control.

7. The automated driving control device according to claim 1, wherein the at least one of the circuit and the processor is further configured to cause the automated driving control device to determine to cancel the autonomous traveling control when a continuation time of an interruption of the recognition of the rear vehicle is equal to or more than a predetermined time.

8. The automated driving control device according to claim 1, wherein the autonomous traveling control includes a traffic congestion limit control limited to traveling in a traffic congestion and an area limit control limited to traveling in a specific area, and the at least one of the circuit and the processor is further configured to cause the automated driving control device to permit a continuation of the traffic congestion limit control when having interrupted the recognition of the rear vehicle after transition to the traffic congestion limit control, and determine to cancel the area limit control when having interrupted the recognition of the rear vehicle after transition to the area limit control.

9. The automated driving control device according to claim 1, wherein the autonomous traveling control includes a traffic congestion limit control limited to traveling in a traffic congestion and an area limit control limited to traveling in a specific area, the at least one of the circuit and the processor is further configured to cause the automated driving control device to determine to cancel a continuation of the traffic congestion limit control when having interrupted the recognition of the rear vehicle after transition to the traffic congestion limit control, and permit a continuation of the area limit control when having interrupted the recognition of the rear vehicle after transition to the area limit control.

10. The automated driving control device according to claim 1, wherein the at least one of the circuit and the processor is further configured to cause the automated driving control device to determine an approaching state of the rear vehicle with respect to the subject vehicle based on a subject-to-rear vehicle distance from the subject vehicle to the rear vehicle, and not permit a start of the autonomous traveling control even when both the front vehicle and the rear vehicle have been recognized in a case where the rear vehicle is in the approaching state with respect to the subject vehicle.

11. The automated driving control device according to claim 10, wherein the at least one of the circuit and the processor is further configured to cause the automated driving control device to determine whether a vehicle distance control is functioning in the rear vehicle, and permit the start of the autonomous traveling control when the vehicle distance control is functioning in the rear vehicle even in a case where the rear vehicle is in the approaching state with respect to the subject vehicle.

12. The automated driving control device according to claim 10, wherein the at least one of the circuit and the processor is further configured to cause the automated driving control device to determine that the rear vehicle is in the approaching state when a continuation time of a state where the subject-to-rear vehicle distance is less than an approaching threshold exceeds a predetermined time.

13. The automated driving control device according to claim 1, wherein the at least one of the circuit and the processor is further configured to cause the automated driving control device to recognize a lane change to a different lane different from the subject vehicle lane where the rear vehicle travels, and determine continuation of the autonomous traveling control when the recognition of the rear vehicle is interrupted due to the lane change to the different lane.

14. The automated driving control device according to claim 1, wherein the at least one of the circuit and the processor is further configured to cause the automated driving control device to recognize a traffic congestion in a periphery of the subject vehicle, and permit continuation of the autonomous traveling control even when the recognition of the rear vehicle is interrupted in a case where the traffic congestion recognition unit has recognized the traffic congestion in the periphery of the subject vehicle.

15. An automated driving control device configured to enable traveling of a subject vehicle by an automated driving function, the automated driving control device comprising:

at least one of (i) a circuit and (ii) a processor with a memory storing computer program code executable by the processor, the at least one of the circuit and the processor configured to cause the automated driving control device to:

recognize a front vehicle and a rear vehicle that travel in a lane same as a subject vehicle lane where the subject vehicle travels;

permit a start of an autonomous traveling control without a periphery monitoring obligation by a driver of the subject vehicle when having recognized both the front vehicle and the rear vehicle; and permit a continuation of the autonomous traveling control even when having interrupted a recognition of the rear vehicle after transition to the autonomous traveling control, wherein the at least one of the circuit and the processor is further configured to cause the automated driving control device to start the autonomous traveling control based on a start instruction operation by the driver after permitting a start of the autonomous traveling control based on recognition of both of the front vehicle and the rear vehicle, and start the autonomous traveling control based on the start instruction operation even when the recognition of the rear vehicle is interrupted until the start instruction operation is performed after permitting the start of the autonomous traveling control.

16. A non-transitory computer-readable storage medium storing an automated driving control program configured to enable traveling of a subject vehicle by an automated driving function, the program causing a processor to:

recognize a front vehicle and a rear vehicle that travel in a lane same as a subject vehicle lane where the subject vehicle travels;

permit a start of an autonomous traveling control without a periphery monitoring obligation by a driver of the subject vehicle when having recognized both the front vehicle and the rear vehicle; and permit a continuation of the autonomous traveling control even when interrupting a recognition of the rear vehicle after transition to the autonomous traveling control, wherein recognition of both of the front vehicle and the rear vehicle by the different vehicle recognition unit is included in a start condition of the autonomous traveling control, and the processor does not satisfy a cancellation condition for canceling the autonomous traveling control due to only interruption of the recognition of the rear vehicle.

17. A non-transitory computer-readable storage medium storing an automated driving control program configured to enable traveling of a subject vehicle by an automated driving function, the program causing a processor to:

recognize a front vehicle and a rear vehicle that travel in a lane same as a subject vehicle lane where the subject vehicle travels;

permit a start of an autonomous traveling control without a periphery monitoring obligation by a driver of the subject vehicle when having recognized both the front vehicle and the rear vehicle;

permit a continuation of the autonomous traveling control even when interrupting a recognition of the rear vehicle after transition to the autonomous traveling control;

start the autonomous traveling control based on a start instruction operation by the driver after permitting a start of the autonomous traveling control based on recognition of both of the front vehicle and the rear vehicle; and start the autonomous traveling control based on the start instruction operation even when the recognition of the rear vehicle is interrupted until the start instruction operation is performed after permitting the start of the autonomous traveling control.

* * * * *